(12) United States Patent
Wood

(10) Patent No.: US 11,159,624 B2
(45) Date of Patent: *Oct. 26, 2021

(54) SYSTEM AND METHOD ENABLED DEVICES ENABLED WITH SYNDICATED DATA ENHANCED FUNCTIONALITY

(71) Applicant: DATACAST LABS LLC, Grant, AL (US)

(72) Inventor: Mark Wood, Maryport (GB)

(73) Assignee: Datacast Labs LLC, Grant, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/091,395

(22) Filed: Nov. 6, 2020

(65) Prior Publication Data

US 2021/0058464 A1  Feb. 25, 2021

Related U.S. Application Data

(63) Continuation of application No. 17/087,832, filed on Nov. 3, 2020, which is a continuation of application
(Continued)

(51) Int. Cl.
*H04L 29/08* (2006.01)
*G16Y 30/00* (2020.01)

(52) U.S. Cl.
CPC .............. *H04L 67/12* (2013.01); *G16Y 30/00* (2020.01)

(58) Field of Classification Search
None
See application file for complete search history.

(56) References Cited

U.S. PATENT DOCUMENTS 6,346,890 B1 * 2/2002 Bellin .................... H04W 4/12
340/9.11
9,367,057 B2 * 6/2016 Phillips .................. G05B 15/02
(Continued)

FOREIGN PATENT DOCUMENTS

WO  2013123445 A1  8/2013

OTHER PUBLICATIONS

International Search Report for PCT/US2018/042927 dated Oct. 3, 2018.
(Continued)

*Primary Examiner* — Backhean Tiv
(74) *Attorney, Agent, or Firm* — Sandberg Phoenix & von Gontard P.C.

(57) ABSTRACT

A device assembly having a syndicated data service interface that is communicatively coupled to a vendor-specific syndicated data application platform and having an installed vendor specific syndicated data application, with the interface receiving point-to-multipoint non-addressed transport bearer channels of different syndicated data channel transport networks initially only including the monitoring of the syndicated data channels and not decoding the syndicated data messages or syndicated data informational data contained therein, identifying from the transport bearer channels a received syndicated data channel having an syndicated data channel identifier of the specific syndicated data device, and reading the syndicated data messages within the received syndicated data channel and extracting the syndicated data supplier-independent informational data from the syndicated data message and providing the extracted syndicated data informational data to at least one of the installed vendor specific syndicated data applications of the syndicated data device.

22 Claims, 8 Drawing Sheets

Related U.S. Application Data

No. 16/632,063, filed as application No. PCT/US2018/042927 on Jul. 19, 2018, now Pat. No. 10,826,996.

(60) Provisional application No. 62/534,555, filed on Jul. 19, 2017.

(56) References Cited

U.S. PATENT DOCUMENTS

| | | | | |
|---|---|---|---|---|
| 9,372,479 | B1* | 6/2016 | Phillips | G05B 19/0423 |
| 9,853,826 | B2* | 12/2017 | Shuman | H04L 12/2803 |
| 10,050,840 | B2* | 8/2018 | Zheng | H04L 63/101 |
| 10,057,382 | B2* | 8/2018 | Sathyadevan | G06N 20/00 |
| 10,104,567 | B2* | 10/2018 | Kodaypak | H04L 12/2803 |
| 10,116,519 | B2* | 10/2018 | Papadopoulos | H04L 67/125 |
| 1,014,933 | A1 | 12/2018 | Gujral et al. | |
| 10,148,737 | B2* | 12/2018 | Choi | H04L 67/42 |
| 10,149,335 | B2* | 12/2018 | Gujral | H04W 76/14 |
| 10,320,795 | B2* | 6/2019 | Samuel | H04W 4/70 |
| 10,362,166 | B2* | 7/2019 | Tran | H04L 65/1069 |
| 10,416,991 | B2* | 9/2019 | Bonar | G06F 21/74 |
| 10,506,047 | B2* | 12/2019 | Yu | H04L 67/12 |
| 10,542,543 | B2* | 1/2020 | Yerramalli | H04B 1/713 |
| 10,582,493 | B2* | 3/2020 | Park | H04W 72/042 |
| 10,609,146 | B2* | 3/2020 | Yang | H04W 4/38 |
| 10,826,996 | B2* | 11/2020 | Wood | H04W 4/70 |
| 2001/0010490 | A1* | 8/2001 | Bellin | H04W 84/027 340/7.46 |
| 2004/0125403 | A1* | 7/2004 | Furst | G06Q 10/0875 358/1.15 |
| 2008/0311926 | A1* | 12/2008 | Fischer | H04W 72/005 455/452.1 |
| 2014/0241354 | A1* | 8/2014 | Shuman | H04L 12/281 370/390 |
| 2017/0187584 | A9* | 6/2017 | Chan | H04L 41/5064 |
| 2018/0184419 | A1* | 6/2018 | Yang | H04W 4/70 |
| 2018/0367958 | A1* | 12/2018 | Dizdarevic | G08G 1/091 |
| 2020/0162556 | A1* | 5/2020 | Wood | G06Q 30/00 |
| 2021/0051202 | A1* | 2/2021 | Wood | G06F 15/00 |
| 2021/0058464 | A1* | 2/2021 | Wood | G06Q 30/00 |

OTHER PUBLICATIONS

Written Opinion for PCT/US2018/042927 dated Oct. 3, 2018.
Valdivieso Caraguay et al. "SDN: Evolution and Opportunities in the Developement IoT Applications." International Journal of Distributed Sensor Networks. vol. 2014, Article ID 735142; May 4, 2014; pp. 1-10.
Karen Rose et al. "The Internet of Things: An Overview—Understanding the Issues and Challenges of a More Connected Work"; Internet Society (ISOC), Oct. 2015.

* cited by examiner

SYSTEM AND METHOD ENABLED DEVICES ENABLED WITH SYNDICATED DATA ENHANCED FUNCTIONALITY

RELATED APPLICATIONS

This application is a continuation of U.S. patent application Ser. No. 17/087,832, as filed on Nov. 3, 2020, which was as continuation of U.S. patent application Ser. No. 16/632,063, as filed on Jan. 17, 2020, and which issues as U.S. Pat. No. 10,826,996, which was a U.S. 371 National Phase Application of PCT Application No. US2018/42927, filed on Jul. 19, 2018, which claimed priority to U.S. Provisional App. No. 62/534,555, filed Jul. 19, 2017, each of which is incorporated herein by reference.

FIELD

The present disclosure relates to Internet of Things (IoT) systems and object devices, and more specifically, to an improved system, method and capabilities for the functionality of IoT devices through non-discriminatory vendor/supplier independent distribution of predetermined IoT syndication data to unidentified and non-registered IoT devices.

BACKGROUND

The statements in this section merely provide background information related to the present disclosure and may not constitute prior art.

Areas seeing exponential development, implementation and user acceptance are devices and services within the broad category of the Internet of Things ("IoT"). IoT is generally considered to be the scenario where Internet connectivity and computing capability extend to a variety of objects, devices, sensors and systems, including everyday household, retail and commercial devices. Consumer, commercial, and industrial products and goods, vehicles, sensors and appliances are being communicatively and connectively combined via Internet or data communications connectively and through the use of cloud services, platforms as a service (PaaS), and new applications such as powerful data analytic capabilities accessing vast stores of data that are transforming the way persons work, live and play and business operate with their customers and each other. Recent adoptions of new consumer IoT devices and implementations in vehicles and appliances indicates that within the next decade there will be more than 100 billion connected IoT devices in the world. However, such growth opportunity creates many challenges as well. The vast majority of these devices will be required to communicate with their IoT platforms and applications through local data network connections. While the bandwidth for local data network connections continues to grow whether through local hard-wired broadband services, satellite services, increased wireless mobile telephone data bandwidth, local Wi-Fi networks, and other local access wireless data networks and services, such data bandwidth availability and limitations in both the local and backbone data networks will continue to be strained or limited as the amount of data supporting the IoT devices and their operations increases exponentially. This will occur at the same time when consumers and the networks will be increasing the use and demand for the same bandwidth to support the exponentially increasing audio/video (AV) services such as Internet based streaming services.

The IoT brings with it the challenge of much larger scale of devices than current networks are designed to handle. As the number of devices balloons exponentially, weaknesses in present network architecture will soon become serious problems. Data communications over various telecommunication systems and networks has continued to grow with the availability of greater bandwidth as well as computer processing and memory capabilities, and most recently readily available inexpensive wireless transceivers and the miniaturization of these components. Early machine-based monitoring and control systems used data networks for monitoring and controlling devices. These first started on a local basis such as with local area networks (LANs), where bandwidth was available, to wide area networks (WANs), and evolved to use the world-wide Internet. Many of the early machine-to-machine (M2M) solutions were vendor-specific systems and solutions. However, industry standards have subsequently been developed along with the low cost and high speed processing and communications. Further, numerous services and applications such as cloud based IoT applications and services have been developed and are being offered that either directly through gateways or gateway services or indirectly through additional cloud based offerings, provide for multi-vendor IoT device support, such as protocol conversion, by way of example.

Another area of expansion has been in the area of cloud computing that utilizes remotely accessed high power computing resources to process, manage, analyze, and store vast quantities of collected data. These enable the aggregation, correlation, and analysis of these large amounts of data providing new opportunities for data extraction and the development of new data and analytics based thereon. These further are made available to small distributed devices through the expanded bandwidth communications networks providing such small distributed devices with access to these vast quantities of data and their powerful back-end enabled analytic and control capabilities. In parallel with these is the increased implementation and use of web-based interfaces over the internet by the expanding use of html based applications that have shifted much of the internet traffic to being web-based interfaces between man and machine as well as between machines.

There are numerous different industry standard and vendor-specific models for IoT devices and their IoT functionality that are well known in the industry and to one of ordinary skill in the art, and as such, are not repeated herein. However, there are common characteristics and models defined for the various IoT systems and industry standards that illustrate the limitations of the current network services and systems to support the continued significant increases in IoT device functionality and application scalability reliant upon the operations of bandwidth constrained or limited networks.

Generally, there are three well known and common IoT components that operate and communicate with each other over these bandwidth-constrained networks. The IoT devices, the IoT application platforms or simply IoT platforms, and IoT gateways. FIG. 1 illustrates the typical prior art IoT components and their architectures with FIG. 2 providing details of a typical existing IoT device.

Referring first to FIG. 1, in a typical current IoT system 100, a plurality of IoT Platform Application Servers 102A, 102B, ("IoT Application Platforms") are provided by different vendors or suppliers of IoT applications and services. Each of these IoT Application Platforms 102 are connected to a communications network 104 that can be the Internet either directly or as a cloud based service or as a Platform as a Service (PaaS). Each Platform server 102, through communication of IoT messages, communicate with one or more (usually a plurality) of IoT devices 106, shown as IoT devices 106A, 106B, 106C, 106D, 106X and 106Y in FIG. 1, for providing IoT application data and primarily for receiving IoT sensed data from each of the IoT devices 106. Each IoT device 106 has an IoT service interface 134 that is shown as IoT service interface 134A, 134B, 134C, 134D, 134X, and 134Y, for communicating IoT messages 137A, 137B, 137C, 137D, 137X, and 137Y to and from the IoT Application Platforms 102 over local internet or data communication links directly over local IoT device communication facilities 136A, 136B, 136C, and 136D, or indirectly over IoT device communication facilities 136X and 136Y that are enabled by a IoT device gateway 112, that is directly communicatively coupled to the Internet or data linked through the network 104 by link 136N that includes IoT messages 137N to and from one or more of the IoT Application Platforms 102.

In the implementations where the IoT device gateway 112 is implemented, such IoT device gateway 112 includes IoT service interface 137N that is communicatively coupled over the network 104 to the IoT Application Platforms 102, and the IoT device gateway 112 provides the local communication with IoT devices 106X, 106Y. This latter implementation is typically provided where the local IoT devices 106X, 106Y do not have full transmission connectivity to the network 104, and therefore utilizes a local wireless connection to the IoT device gateway 112 that serves as a proxy or pass through gateway, or that can provide other functions such as protocol conversion and local IoT service support, as well as multi-vendor or supplier support where IoT device 106X utilizes a different set of protocols as compared to IoT device 106Y.

As described herein, the current IoT system 100 provides for all communications between each IoT Application Platform 102 to those IoT devices that are registered with it, for providing IoT messaging on an addressed or group addressed basis, either on a polled or pushed basis as described in this background section. Existing IoT devices have a single IoT service interface 134 for communicating with the IoT Application Platforms 102 to which it is registered and known for providing the IoT services and in particular providing IoT sensed data back to the IoT Application Platform 102 that is then utilized by various IoT based applications in the IoT Application Platform 102 for providing IoT application services to the users or owners of the IoT devices 106 or to third parties as may be the implementation. It should be noted that within the architecture of the system 100, an IoT device 106A can be standalone devices or can be implemented as component or module or functionality of an IoT-enabled operational system 108 such as a home HVAC, an appliance, or a vehicle, by way of examples, having the IoT device 106A implemented or embedded therein. In other embodiments, the IoT device 106D can be one of many IoT devices 106D that are implemented within an overall operational system 110 such as multiple HVAC thermostats and control units that are within a commercial or industrial implementation or building. While not shown, these latter systems typically include an IoT device gateway 112 in their implementation. However, regardless whether one or more IoT devices 106 or whether implemented using an IoT device gateway 112, the logical one-to-one relationship between an IoT device and one or more IoT Application Platforms 102 provides the infrastructure for logical communications therebetween.

A typical detailed implementation of a current IoT device 106 is shown in FIG. 2. The current IoT devices 106 are smart devices in that they include a processor 130 having a memory 132 and are enabled and operationally configured by an operating system software and application programs 133, each of which are implemented using computer executable instructions in firmware or software that are resident in or associated with the IoT device 106. Each IoT device 106 includes a power supply 128 and often these include a power interface 129 for receiving external power or powering of the power supply 128. Further in support of the IoT device 106 functionality as an IoT device, the IoT device includes IoT application programs 131 that enable the IoT functionality of the IoT device 106. As addressed above, an IoT service interface 134 typically is a wired or wireless communication interface communicatively coupled to the IoT Application Platform 102 via a communication link 136 for communicating the IoT Application Platform messages 137 from and to the IoT Application Platform 102.

Current IoT devices 106 in various implementations further can include one or more IoT sensor interfaces 150 for coupling to IoT sensors 152 (shown as 152A and 152B), each of which provides the IoT sensor interface 150 with a sensed characteristic or sensed data 153A and 153B, respectively. As shown, these are typically one way receive only communications, at least for the purpose of receiving the sensed data 153. Similarly, the IoT device 106 can include combined with the IoT sensor interface 150 or as a separate IoT actuator interface 160 an interface for controlling an IoT-enabled actuating device 162 through the providing of an IoT actuating command 163. IoT actuator interface can be a one way or two way communication channel, depending on the particular actuating device 162 functionality and capabilities. The IoT device 106 can further include, in some embodiments, an interface 212 that is communicatively coupled to support devices 140 and 142 via communication links 144 and 146 respectively for receiving messages 145 and 147, again respectively. Such support devices 140 and 142 can be of any type of system or assembly including a user interface, a local operating system, another IoT device 106, a local computing device or similar locally based system, by ways of examples and not intending to be limited thereto.

Based on this brief overview, additional features and operating capabilities and features of current IoT devices and systems will now be described as background to the herein described newly developed and novel systems and methods. As described above, the IoT devices 106 range from very complex to minimal complexity. IoT devices 106 can be physical devices, logical groups of physical devices, or logical devices that are implemented as software or firmware instances within one or more physical devices. Each typically includes directly or indirectly a microprocessor with a memory and communication interface and enabled by an IoT device operating system and one or more IoT device application programs. The IoT devices can be "smart devices" or "smart objects" that typically have significant constraints such as limited power, limited memory, limited processing resources, and limited communications bandwidth, and that have, in most cases, limited required human interaction, at least as to their IoT device functionality. Some IoT devices have local operations user interfaces as well as data collection and data and user control input interfaces. In most cases though, the local operations interface of an IoT device is directed at the operations or purpose of the object such as a user control of a thermostat for a home HVAC system, and are not directly towards or associated with the IoT device IoT functionality or capability or IoT application.

Current IoT devices can include sub-devices within an IoT such as sensors used to collect local IoT application identified IoT data. This IoT data is commonly referred to as IoT telemetry where it is read-only IoT data as received from the IoT device. For instance, IoT telemetry include IoT sensed environmental data that is sensed by an IoT sensor, provided to the IoT device and then transmitted to the IoT Application Platform 102 where it is stored and analyzed. These IoT sub-devices are generally referred herein within the definition of the IoT device or collective IoT device and not separately discussed. Generally, each IoT sensor provides its sensed or obtained data from a local operation or environment and provides the IoT sensed data to the IoT device. The IoT device application typically provides for the communication or transmission of the IoT device data including the IoT sensed data from the IoT device to the IoT Application Platform. This communication is typically either directly from the IoT device if the IoT device is communicatively connected to the Internet or a data communication network, or indirectly through a local IoT device gateway, as will be described below. The transmission of the IoT data from the IoT device to the IoT Application Platform is either on a polled basis or on a push basis.

The pushed IoT data is transmitted by the IoT device based on predefined factors such as time, data, or availability of the IoT data by the IoT device, such as when received from an IoT sensor, each of which is defined by the IoT device application program. While there are no strict rules on pushed IoT data, typically pushed data is used when the IoT device or IoT application wants to report a fairly small subset of IoT data at high rates and in real time. The pushed data is typically small packets of the sensed IoT data that is time sensitive and required for use or updating by the IoT Application Platform application. By way of example, typical IoT push service can be provided through specific transport protocols such as HTTP, WebSocket, MQTT over WebSocket and MQTT over TCP. Depending on the selected or implemented method, a pushed IoT message is either directly pushed to a particular device through the WebSocket protocol or provided to polling devices through HTTP. These pushed IoT message types must be defined either as a "to device" or as a "bidirectional" direction. The current IoT systems provide that messages identified as "from device" will result in an error and are not pushed to the IoT device. As such, current push IoT messages are each addressed to particular IoT devices based on their known IoT ID ("Device ID") or other unique device identifier and as therefore are point-to-point addressed IoT messages.

Otherwise, polled IoT data is transmitted to the IoT in response to receiving a polling request for the IoT data from the IoT Application Platform or where the IoT device is not directly connected to the Internet, the IoT gateway can provide a polling of the IoT device to obtain the sensed data, and then transmits the received polled sensed IoT data to the IoT Application Platform. Polled IoT data is the generally implemented format within IoT for the IoT Application Platform or IoT Application Platform application to collect the vast amount of data of different types from the many IoT devices registered with and associated with or using the IoT Application Platform and its IoT Application Platform application. Polled IoT device data is responsive to receiving a polled IoT data request that is addressed on a point-to-point addressing from the IoT Application Platform by the IoT device. In some cases, the polled IoT data request can be received on a group channel or telemetry channel. In each case, however, obtained, the IoT device transmits the requested IoT data in response to the receipt of the polled IoT data request. One or both methods can be implemented by any one IoT device or IoT device application.

Each current IoT device is identified and identifiable by a uniquely assigned IoT identifier (ID) that typically never changes and is static for the lifespan of the implemented IoT device. Each IoT device further includes a profile and is assigned an IoT class or type of IoT device, an IoT device model number, an IoT device revision number such as a firmware version, a date of manufacture and an IoT device hardware serial number. Each of these, where included, are included in the IoT device profile, and stored in the IoT device and typically also stored in the IoT Application Platforms for which the IoT device is registered. In this manner, the IoT device is uniquely and separately identifiable by the IoT Application Platform, the IoT gateway and other IoT devices operating on a peer-to-peer basis with the IoT device.

Current IoT devices can also transmit to the IoT Application Platform its current IoT device state or state information. This is typically only the communications or operational aspects of the IoT device and is not related to any particular IoT application. The IoT device can update its IoT state information by transmitting its state information to the IoT Application Platform on a frequent or predetermined timed basis, or on a pushed or polled basis, in order to inform the IoT Application Platform of the current status of the IoT device. The IoT device can also transmit, in similar manners, IoT operational information that can include operating characteristics of the IoT device that is related to the operational capability of the IoT device to perform its IoT applications, and not related to the IoT application itself. For instance, this may include the updating of the IoT device profile such as a firmware upgrade or version or the power level of a local battery, by ways of examples.

It should be understood that each IoT device may be manufactured by a different IoT device vendor or supplier and each may include vendor defined or specific operating systems, firmware, protocols and operational functionality. This can include the intended functional operation of the IoT application or implementation or services.

Each IoT device further includes a communication interface, which is most often a serial interface for communicating over the Internet. These interfaces control the flow and timing of binary information between the IoT device and the IoT Application Platform over one or more communication networks. However, any suitable communication protocol or transmission network capability can be used by an IoT device.

Addressed above, in some instances and implementations, an IoT gateway is implemented that communicatively operates between an IoT device and the IoT Application Platform or IoT Application Platforms for which the IoT device is associated on an IoT application basis. IoT gateways can be implemented on a physical network component or can be implemented as a logical or cloud based IoT application. IoT gateways are implemented in some cases to enable IoT devices that are connectable to a local communication network but not directly connected to the Internet to enable the transmission of the IoT data from such IoT devices to be transmitted over the Internet to one or more IoT Application Platforms. The functionality of an IoT gateway is not limited to a data processing or data gateway as many IoT gateways provide IoT application level functionality in addition to the communication level gateway functionality.

In some cases, there is a modified model whereby a gateway or intermediary server functionality is placed between the IoT device and the IoT Application Platform.

Some IoT gateways can include an IoT application service provider functionality for support of their communications functions as an IoT device aggregator, hub or protocol converter for increased IoT device interoperability, but such do not separately add a new functionality to the communication model between the IoT device and the IoT Application Platform, but rather fills in for missing functionality when not fully implemented by one or more IoT device. IoT gateway can provide functionality for transport layer security, IoT data compaction, aggregation and storage, real-time clock and battery backup, communication protocol conversions and in some cases, operating system, firmware or application conversions such as between different vendor or supplier systems to enable different vendor developed IoT devices to operate with a different IoT Application Platform or IoT application.

The IoT Application Platforms as known herein is typically a cloud-based or server-based computing platform having one or more IoT applications collecting, managing and controlling registered IoT devices. These IoT Application Platforms and the IoT applications and services that they provide to the IoT devices are included within the concept of a platform as a service (PaaS). These IoT Application Platforms provide services to enterprises operating enterprise application servers that utilize the collected IoT data from one or more IoT devices to offer IoT based services directly or indirectly to consumers and businesses through one or more IoT devices. The IoT Application Platforms often provide enterprise development and service hosting functionality to enterprise services operators that offer the enabling connectively, services and storage. A single IoT Application Platform can provide common IoT solutions through communications over networks for interfacing with and communicating with IoT devices that not only transmit a rich collection of locally obtained IoT data from the IoT devices (from the IoT sensors associated therewith) to the IoT Application Platform. These require the receipt of IoT communications that includes IoT applications, IoT application data and IoT analytics data from the IoT Application Platform in order to properly perform their local functions. Both of these require an ever increasing amount of nearly continuous communications bandwidth between the IoT Application Platforms and their IoT devices.

In additional to receiving the IoT data or IoT telemetry from IoT devices that is uniquely identified by IoT device IDs, either as pushed IoT data in response to IoT Application Platform initiated requests, the IoT Application Platforms communicate with IoT devices by providing IoT commands to the IoT devices. IoT commands are actions or instructions that are provided to the IoT device. IoT commands are most often used in controlling or provide control commands to IoT devices that include actionable functionality. IoT commands are addressed point-to-point commands that are addressed by the IoT Application Platform to the specific IoT device based on the IoT device ID or address, or both.

An IoT system can also include the concept of IoT back end data sharing, but such back end data sharing is between IoT Application Platforms or between IoT enterprise service providers. These enable users or IoT devices to export and analyze IoT device data as received from another source. Typically, an IoT user or IoT application will grant access to the IoT data to another application through an application program interface (API), such as for example an application obtaining map or location data from a mapping or location data application rather than duplicating such within its own application.

The typical IoT Application Platform provides various IoT device functions in support of the offered IoT applications based on the IoT data obtained from its registered and known IoT devices. These include IoT device management, IoT device provisioning, IoT device and application operations, and IoT device updates. IoT provisioning can include identifying IoT device ID and other IoT device metadata or profile data, determining and establishing IoT device credentials, authentication and registration, and establishing necessary point-to-point logical and physical communications links between the IoT Application Platform and each IoT device. Further, as is often the case, the IoT Application Platform having numerous IoT devices registered therewith must provide IoT updates to some or all IoT devices on an individual or group basis, each of which is often provided on a push data basis from the IoT Application Platform to each registered IoT device based on the desired IoT profile as compared to the current IoT profile. This can include updated the IoT device operating systems, firmware or application software, each of which is provided by the IoT Application Platform device management processes based on the IoT device profiles and addressed on a point-to-point communication to each IoT device based on the known address of the IoT device that is registered with the IoT Application Platform, or based on a class or type of IoT device again based on the IoT device profile as registered IoT device.

In some implementations, an IoT Application Platform includes streams or channels whereby an IoT application on an IoT Application Platform can subscribe to specific streams of IoT device data without having to construct subscriber-specific channels for each device. By using such IoT Application Platform channels, the system can rate level incoming IoT data streams. Further from the IoT device side, such data streams of IoT data to the IoT Application Platforms can be restricted where IoT devices have limited ability to store and retry sending IoT telemetry or other IoT data to the IoT Application Platform. When an event or polling request occurs, an IoT Application Platform can become overwhelmed with IoT data transmission from the many registered IoT devices and aggregating these through IoT channels and gateways can help to meter the flow of the IoT device data to the IoT Application Platform. Current IoT Application Platforms are aided in the management of the received IoT data from the many IoT devices by IoT pipeline data management on the IoT Application Platform through transforming or converting of the received IoT data into a predetermined standard format, aggregating the received IoT data, enriching the received IoT data with metadata associated with the transmitting IoT device from the IoT device profile associated with the IoT device ID of the received IoT data, by ways of example. These all aid the IoT Application Platform in managing the large influx of IoT data from the increasing number of IoT devices registered for an IoT Application Platform's IoT application.

Between these IoT system components, there are typically two communication models. The first is an IT device-to-device communication model whereby two or more IoT devices directly connect and communicate between one another. These IoT devices communicate over various types of local networks but are device-to-device or point-to-point communications, such that each IoT device knows the other device and its IoT ID or network address to which it is communicating. In most cases, today these are IoT devices or vendor specific communications protocols. The other IoT communication model is the IoT device-to-platform communications where by an IoT device logically communicates directly or indirectly via an Internet service to the IoT Application Platform for the exchange of data and control messages. These communications are typically over open standard network interfaces such as Wi-Fi, cellular data, and the Internet. This IoT device-to-platform communication uses the Internet, but often today and most likely in the future, vendor or IoT Application Platform specific protocols are used and are often IoT application specific.

As such, IoT Application Platforms and IoT devices communicate via point to point addressed communication packets as each are uniquely identifiable to each other through the registration and authentication processes as described above. The IoT Application Platforms and the IoT devices have their own profiles and interfaces and applications and the communications between an IoT Application Platform and each IoT device is on a point-to-point IoT device ID basis, from the particular IoT Application Platform for a particular IoT application to a particular, unique and individual IoT device, or a gateway acting on its behalf, and in the reverse. This not only provides the per-device IoT applications, but provides the desired IoT application security of such IoT application data communications.

As the number and complexity and sophistications of the IoT devices grows, and the number of PaaS services and number of IoT Application Platforms grown, the demand for communications bandwidth to support these IoT point-to-point addressed communications between over 10 billion IoT devices will grow. As such, there is a need for systems and methods that can enhance the services offerings of the IoT Application Platforms without requiring further communication bandwidth, but that can also provide for a reduction in the need for current use of the bandwidth.

Further, as addressed above, the primary focus of the IoT Application Platforms communicating with registered IoT devices have been to poll or request data from each IoT device on a device or group basis, to provide commands for operation of the specific IoT device, to provide provisioning, operations and updates to each specific IoT device. While existing IoT Application Platforms provide some updating of information and data to IoT devices, such updates are either on an IoT group basis or on a point-to-point IoT ID addressed basis between the IoT Application Platform and the IoT device. As such, the IoT Application Platform is required to provide and manage all of the required data, utilize its processing capability in performing such updates, and utilize the downstream bandwidth in addressing the IoT device operational data updates as required for the IoT device to perform the IoT services and operations.

As such, there is a need within the IoT systems for the ability to disseminate data to IoT devices without requiring additional IoT Application Platform and network resources, while enhancing the operational capabilities of IoT devices by ensuring that such IoT devices are provided with new timely and up-to-date external data information that can be utilized by the IoT devices and their applications to enhance their IoT device capabilities, operations and services.

SUMMARY

The inventor hereof has succeeded at designing systems and methods that enhances the ability of the IoT Application Platforms and IoT devices, while reducing the need for bandwidth and operation and management of point-to-point communications between each IoT Application Platform with each registered IoT device for providing a particular IoT service or informational update to that IoT device. As will be described, the present disclosure describes systems and methods at the application level, at the supporting and enabling network level, and at the component level. This includes new and novel service capabilities to any IoT Application Platform and IoT device components and any IoT gateways in support thereof, with such new IoT services providing IoT support and IoT application services including data that is both network and IoT vendor or supplier independent. As such, the present systems and methods provide a new capability that is usable and accessible by all IoT devices and where IoT application programming for such IoT devices can be enhanced to monitor and obtain such IoT information updates and to use such updated information, without reliance on the accessibility and availability of the IoT Application Platform to which its IoT device or IoT application is registered. The present systems and methods provide the ability for IoT applications to be developed to include via this newly developed set of IoT informational channels and IoT informational data that is not otherwise available to IoT applications or IoT devices. Further, the presently introduced newly developed and novel IoT systems and methods include new forms of IoT informational data that was not previously available including, by way of example, geographically directed data.

The present system as described herein provides a broadcast (defined herein as point to multipoint) transmission of syndicated IoT data from a new IoT syndication data source over new IoT syndication data channels. Each IoT device is hereby configured to monitor the IoT syndication data channels for those that are applicable to each IoT device. Each IoT device, through its predetermined programming, can select one of numerous IoT syndication data channel transmission systems, one or more IoT syndication channels to monitor, and then only open and extract IoT syndication data from those IoT syndication data channels that each IoT device determines is applicable to that IoT device. The identity and address of each IoT device that receives the IoT syndication channel and data therein is unknown to the IoT syndication system transmitting the IoT syndication data channel and the IoT Application Platform to which the IoT device is registered is not involved with and does not control the transmission of the IoT syndication channels or channel data and does not control and is not involved in the determination of the receipt of the IoT syndication data by its registered IoT devices.

According to one aspect, an improved Internet of Things (IoT) system and method providing a plurality of IoT devices with syndicated vendor-independent IoT data by a server receiving from IoT informational data sources informational data that is IoT supplier-independent, formatting the received IoT informational data into syndicated IoT data messages, creating syndicated IoT channels, transmitting using broadcasting over one or more point-to-multipoint non-addressed transport bearer channels, and the IoT devices monitoring the received point-to-multipoint non-addressed transport bearer channels of the different syndicated IoT channel transport networks, identifying a received IoT channel as a function of a comparing to the store IoT message or channel selection criteria to the received IoT channel or IoT message contained therein, where successful reading the IoT data messages within the received IoT channel, extracting the IoT supplier-independent informational data from the IoT data message and providing the extracted IoT informational data to an installed vendor specific IoT application.

According to another aspect, an improved Internet of Things (IoT) method for providing a plurality of IoT devices with syndicated vendor-independent IoT data for use thereby, each IoT device having an IoT service interface that is communicatively via a data network to one or more vendor-specific IoT application platforms and having one or more installed vendor specific IoT applications. The method comprising the steps of storing one or more IoT message or channel selection criteria, receiving the one or more of the point-to-multipoint non-addressed transport bearer channels of one or more different syndicated IoT channel transport networks, and monitoring the received one or more of the point-to-multipoint non-addressed transport bearer channels of one or more different syndicated IoT channel transport networks. The method also including the steps of identifying from the monitored transport bearer channels a received IoT channel as a function of a comparing to the store IoT message or channel selection criteria to the received IoT channel or IoT message contained therein, reading the IoT data messages within the received IoT channel where a successful comparing, extracting the IoT supplier-independent informational data from the IoT data message, and providing at least a portion of the extracted IoT informational data to at least one of the installed vendor specific IoT applications of the IoT device.

According to yet another aspect, an improved Internet of Things (IoT) system providing a plurality of IoT devices with syndicated vendor-independent IoT data for use thereby, each IoT device having an IoT service interface that is communicatively coupled via a data network to one or more vendor-specific IoT application platforms and having one or more installed vendor specific IoT applications, the improved IoT system comprises a server system. The server system has an input data interface communicatively coupled to a plurality of informational data sources, an informational data harvesting component for identifying and receiving IoT supplier-independent informational data from the coupled informational data sources, and a syndicated data format engine collecting and formatting at least a portion of the received IoT supplier-independent informational data into prepared syndicated IoT data messages. The system also is configured for creating a plurality of predetermined syndicated IoT channels, the creating including formatting each syndicated IoT channel to include a predetermined syndicated IoT channel identifier and predetermined portions of the received syndicated IoT data messages into one of a plurality of different predetermined point-to-multipoint non-addressed transport bearer channel formats. The system and method also includes transmitting over a bearer channel compatible output interface each compatible formatted syndicated IoT channel for delivery thereof by at least one syndicated IoT channel transport network transmitting using broadcasting the syndicated IoT channel having the syndicated IoT data messages using point-to-multipoint non-addressed transport bearer channels from the second server system to a plurality of IoT devices.

In another aspect, an improved Internet of Things (IoT) device assembly having a processor and an IoT service interface that is communicatively coupled via a data network to one or more vendor-specific IoT application platforms and having one or more installed vendor specific IoT applications, the improved IoT assembly comprising a memory for storing one or more predetermined IoT device specific IoT channel identifiers and a syndicated IoT interface adapted for receiving one or more of the point-to-multipoint non-addressed transport bearer channels of one or more different syndicated IoT channel transport networks, the receiving initially only including the monitoring of the IoT channels and not processing of the IoT channels to decode the IoT data messages or IoT informational data contained therein, the interfaced further adapted for identifying from the received and monitored transport bearer channels a received IoT channel having an IoT channel identifier of the specific IoT device as stored in the memory, and where identified, reading the IoT data messages within the received IoT channel and extracting the IoT supplier-independent informational data from the IoT data message and providing at least a portion of the extracted IoT informational data to at least one of the installed vendor specific IoT applications of the IoT device.

In still another aspect, a method if provided for operating an improved Internet of Things (IoT) system providing a plurality of IoT devices with syndicated vendor-independent IoT data for use thereby, each IoT device having an IoT service interface that is communicatively coupled via a data network to one or more vendor-specific IoT application platforms and having one or more installed vendor specific IoT applications. The improved IoT method comprises the steps in a server system having an input data interface communicatively coupled to a plurality of informational data sources that includes harvesting IoT informational data including identifying and receiving of the harvested IoT supplier-independent informational data from a plurality of coupled informational data sources, collecting the harvested IoT informational data, formatting at least a portion of the received IoT informational data into prepared syndicated IoT data messages, and creating a plurality of predetermined syndicated IoT channels, the creating including formatting each syndicated IoT channel to include a predetermined syndicated IoT channel identifier and predetermined portions of the received syndicated IoT data messages into one of a plurality of different predetermined point-to-multipoint non-addressed transport bearer channel formats. The method also includes transmitting over a bearer channel compatible output interface each compatible formatted syndicated IoT channel to at least one syndicated IoT channel transport network providing the compatible syndicated IoT channel bearer service.

According to yet another aspect, the system includes an improved Internet of Things (IoT) system providing a plurality of IoT devices with syndicated vendor-independent IoT data for use thereby, each IoT device having an IoT service interface that is communicatively coupled via a data network to one or more vendor-specific IoT application platforms and having one or more installed vendor specific IoT applications. The improved IoT system comprises a server system having an input data interface communicatively coupled to a plurality of informational data sources, an informational data harvesting component for identifying and receiving IoT supplier-independent informational data from the coupled informational data sources, a syndicated data format engine collecting and formatting at least a portion of the received IoT supplier-independent informational data into prepared syndicated IoT data messages, creating a plurality of predetermined syndicated IoT channels, the creating including formatting each syndicated IoT channel to include a predetermined syndicated IoT channel identifier and predetermined portions of the received syndicated IoT data messages into one of a plurality of different predetermined point-to-multipoint non-addressed transport bearer channel formats, and transmitting over a bearer channel compatible output interface each compatible formatted syndicated IoT channel. The system also includes a plurality of different syndicated IoT channel transport networks configured for transmitting using broadcasting the syndicated IoT channel having the syndicated IoT data messages using point-to-multipoint non-addressed transport bearer channels from the second server system to a plurality of IoT devices. The system also includes the plurality of IoT devices each including a memory storing one or more IoT message or channel selection criteria, each IoT device having one or more syndicated channel IoT interfaces adapted for receiving and monitoring one or more of the point-to-multipoint non-addressed transport bearer channels of one or more different syndicated IoT channel transport networks, identifying from the received and monitored transport bearer channels a received IoT channel as a function of a comparing to the store IoT message or channel selection criteria to the received IoT channel or IoT message contained therein, and where a successful comparing reading the IoT data messages within the received IoT channel and extracting the IoT supplier-independent informational data from the IoT data message and providing at least a portion of the extracted IoT informational data to at least one of the installed vendor specific IoT applications of the IoT device.

According to still another aspect, an improved Internet of Things (IoT) system is provided with a plurality of IoT devices with syndicated vendor-independent IoT data for use thereby, each IoT device having an IoT service interface that is communicatively coupled via a data network to one or more vendor-specific IoT application platforms and having one or more installed vendor specific IoT applications. The improved IoT system comprises a first server system having an input data interface communicatively coupled to a plurality of informational data sources, an informational data harvesting component for identifying and receiving IoT supplier-independent informational data from the coupled informational data sources, a syndicated data format engine collecting and formatting at least a portion of the received IoT supplier-independent informational data into prepared syndicated IoT data messages and transmitting the prepared syndicated IoT data messages over an output data interface. The system also includes a second server system having an input interface for receiving the transmitted prepared syndicated IoT data messages from the first server system, the second server system configured for creating a plurality of predetermined syndicated IoT channels, the creating including formatting each syndicated IoT channel to include a predetermined syndicated IoT channel identifier and predetermined portions of the received syndicated IoT data messages into one of a plurality of different predetermined point-to-multipoint non-addressed transport bearer channel formats, and transmitting over a bearer channel compatible output interface each compatible formatted syndicated IoT channel to at least one syndicated IoT channel transport network providing the compatible syndicated IoT channel bearer service. The system further includes a plurality of different syndicated IoT channel transport networks configured for transmitting using broadcasting the syndicated IoT channel having the syndicated IoT data messages using point-to-multipoint non-addressed transport bearer channels from the second server system to a plurality of IoT devices. The system also includes the plurality of IoT devices each including a memory storing one or more IoT message or channel selection criteria, each IoT device having one or more syndicated channel IoT interfaces adapted for receiving and monitoring one or more of the point-to-multipoint non-addressed transport bearer channels of one or more different syndicated IoT channel transport networks, identifying from the received and monitored transport bearer channels a received IoT channel as a function of a comparing to the store IoT message or channel selection criteria to the received IoT channel or IoT message contained therein, and where a successful comparing reading the IoT data messages within the received IoT channel and extracting the IoT supplier-independent informational data from the IoT data message and providing at least a portion of the extracted IoT informational data to at least one of the installed vendor specific IoT applications of the IoT device.

In another aspect, what is provided is an improved Internet of Things (IoT) method for providing a plurality of IoT devices with syndicated vendor-independent IoT data for use thereby, each IoT device having an IoT service interface that is communicatively via a data network to one or more vendor-specific IoT application platforms and having one or more installed vendor specific IoT applications. The method comprises in one or more server systems that are IoT device supplier and IoT application supplier independent, the steps of receiving from a plurality of IoT informational data sources informational data pre-identified IoT supplier-independent informational data, identifying the received IoT informational data, formatting at least a portion of the received IoT informational data into prepared syndicated IoT data messages, creating a plurality of predetermined syndicated IoT channels, the creating including formatting each syndicated IoT channel to include a predetermined syndicated IoT channel identifier and predetermined portions of the received syndicated IoT data messages into one of a plurality of different predetermined point-to-multipoint non-addressed transport bearer channel formats and transmitting over a bearer channel compatible output interface each compatible formatted syndicated IoT channel to at least one syndicated IoT channel transport network providing the compatible syndicated IoT channel bearer service. The method also includes in one or more different syndicated IoT channel transport networks communicatively coupled to the one or more servers, the step of transmitting using broadcasting the syndicated IoT channel having the syndicated IoT data messages using point-to-multipoint non-addressed transport bearer channels. In another portion of the steps, in a plurality of IoT devices having a processor, and a memory, with each IoT device having one or more syndicated channel IoT interfaces adapted for receiving and monitoring one or more of the point-to-multipoint non-addressed transport bearer channels of one or more different syndicated IoT channel transport networks, the method includes storing one or more IoT message or channel selection criteria, receiving the one or more of the point-to-multipoint non-addressed transport bearer channels of one or more different syndicated IoT channel transport networks, monitoring the received one or more of the point-to-multipoint non-addressed transport bearer channels of one or more different syndicated IoT channel transport networks, identifying from the monitored transport bearer channels a received IoT channel as a function of a comparing to the store IoT message or channel selection criteria to the received IoT channel or IoT message contained therein, reading the IoT data messages within the received IoT channel where a successful comparing, extracting the IoT supplier-independent informational data from the IoT data message, and providing at least a portion of the extracted IoT informational data to at least one of the installed vendor specific IoT applications of the IoT device.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments,

BRIEF DESCRIPTION OF THE DRAWINGS

It should be understood that throughout the drawings, corresponding reference numerals indicate like or corresponding parts and features.

DETAILED DESCRIPTION

Figure 1:
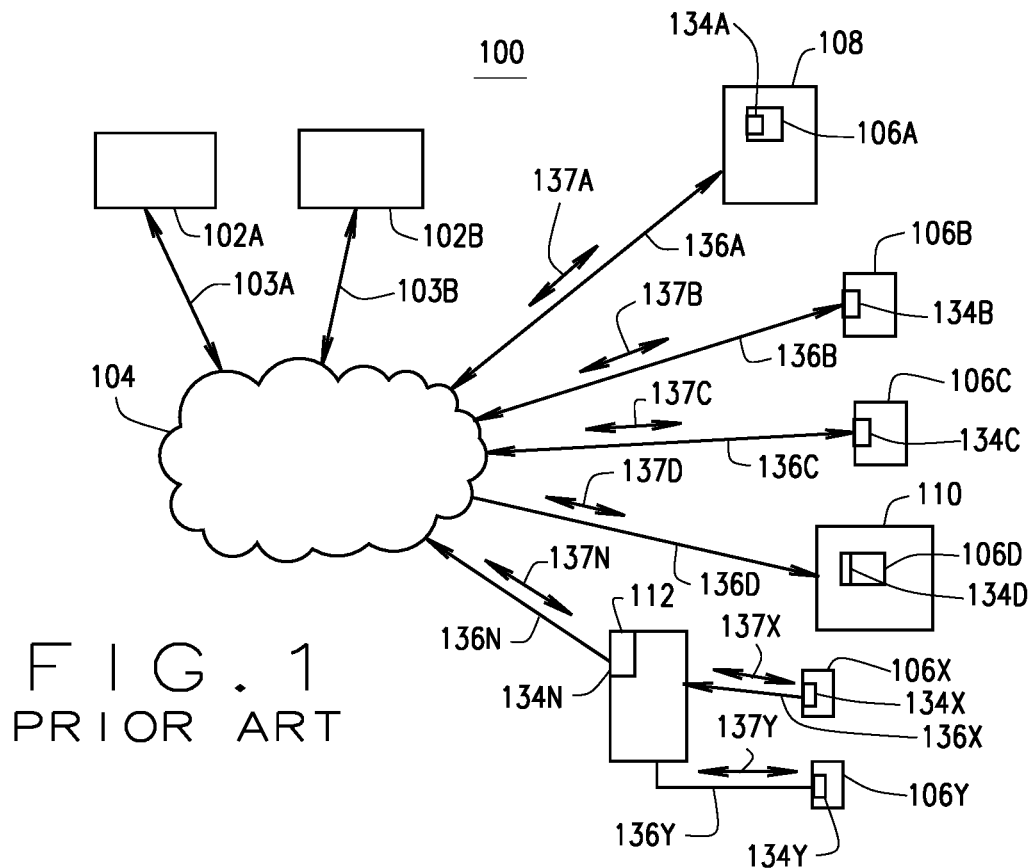
FIG. 1 is block diagram of a prior art internet of things (IoT) system architecture and operating components according to a typical arrangement.

The following description is merely exemplary in nature and is not intended to limit the present disclosure or the disclosure's applications or uses.

As described herein, new systems and methods within the growing IoT systems and implementations will provide IoT devices new syndicated informational data that is not currently available to IoT devices or their IoT applications and therefore their operations. The presently described systems and methods, as shown in the various exemplary embodiments described herein, provides a vendor/supplier independent capability to all IoT devices through the providing real-time or near real-time continuous streaming of value enhancing external non-IoT device or application specific informational data. All such syndicated data and information contained within the one or more IoT passive simple syndication (PSS) system is "broadcast" (e.g., point to multi-point) non-IoT device addressed channels over one or more applicable and suitable communication network capabilities. Each IoT device is enhanced through a new capability as described herein to passively monitor one or more of the IoT syndicated channels and self-determine through IoT device specific programming which of the IoT syndicated channels are applicable to that particular IoT device or one or more of its IoT device applications. Neither any of the IoT syndication systems that broadcast one of the IoT syndicated channels nor the IoT Application Platform is aware or knowledgeable at to the identity, IoT ID, or address or location of the IoT device that receives and obtains the IoT syndicated channel or any IoT syndicated information data.

PSSS System

Unlike the prior art IoT system and system components, the present disclosure introduces not only a new IoT system functional system, referred herein as the passive simple syndication server (PSSS). The PSSS is configured to collect data from a variety of data and informational sources and is not limited. The PSS information sources can be data feeds from various databases or systems for providing real-time or near real time PSS informational data that is predetermined to be included in a PSS Channel that is transmitted to IoT devices for use by IoT applications operational within the IoT devices. The PSSS is configured with a front end that collects and harvests the various PSS informational data from the various PSS information sources and then to format the collected harvested PSS informational data into the predetermined PSS messages, and further formatted to create predetermined PSS Channels of the PSS messages. The PSSS includes PSS IoT message distributor having interfaces to one or more PSS bearer networks that are referred herein as PSS IoT transport networks (PSS Nets).

The PSS IoT message distributor or a PSS format engine either within the PSSS or as a separate formatter component is configured to format the PSS Channels into the formats necessary for transmission and receipt of each of the PSS Nets, while still maintaining the PSS Channel information integrity. These can include the converting of the PSS information using protocol formatting compression, hashing or encryption, by way of example. These provide the necessary data formatting for transport of the PSS Channel over the particular bearer network or PSS Net. The PSS formatter provides the necessary protocol and transmission signal conversion and formatting for each available PSS Net. For instance, the same PSS Channel can be transmitted over a plurality of different PSS Nets, wherein the only difference may be the difference related to the bearer channel transport requirements through the particular PSS Net. However, in some embodiments, each PSS Channel regardless of the PSS Net bearer transport protocol and configuration will include the ID of the PSS Channel (PSS Channel ID) that uniquely identifies each PSS Channel as the PSS Channel. This can include uniquely identifying the PSS Channel by use of metadata, a header, an encryption or other predetermined means for uniquely identifying the transmission through the PSS Net as being a PSS Channel and also identifying the particular PSS Channel.

PSS Bearer Networks (PSS Nets)

Additionally, unlike the existing prior art IoT network, the presently presented system and method includes new IoT supporting PSS IoT transport networks (PSS Nets) (PSS bearer networks) and network functionality for providing transmission and ultimate reception of PSS IoT syndicated data channels from the PSSS to one or more PSS IoT equipped devices. The PSS Nets and PSS Channels are unlike other prior art transmission capabilities such as Real Simple Syndication (RSS), wherein RSS is used to stream common information to subscribers. This is because RSS is in fact a push technology requiring separate copies of the same message to be sent to each receiver individually as a point-to-point addressed transmission. As with IoT, RSS by itself has serious problems when the scale of the syndication is enlarged, as bandwidth consumption is increased directly in proportion to the number of devices addressed. In addition a data base of devices subscribing or being registered to the RSS information is required to be maintained. In contrast as described herein, the PSS preferably utilizes a broadcast/multicast bearer service of each PSS Net to passively stream the PSS Channel data without needing the address or IoT ID of the IoT devices. Further, the PSS transmits, in some embodiments, over various predetermined channels and each transmission over each Channel, in some embodiments, can include a geodetic location that is applicable to the particular syndicated channel data message. As the PSS Channels are being transmitted to all IoT devices within the transmission scope of each PSS Net, by using point-to-multipoint bearer services in the various PSS Nets, for each PSS Net, only one copy of the PSS Channel Data and the PSS Channel Information contained therein needs be transmitted for each PSS Net that may be used as a PSS bearer service. As a result, a thousand fold reduction in the required network bandwidth to disseminate PSS IoT syndicated data is provided over the prior art that uses IoT device addressed point-to-point messaging.

As to most wireless technologies and even many wired technologies, typically the only bearer service technology which is immune to the problems of increased distribution scale and numbers of receivers such as IoT devices or other devices such as mobile devices is the broadcast or multicast channels that are provided in such systems. However, these broadcast and multicast channels are typically only used by the telecommunications systems, at least until recently, when the U.S. and began to implement emergency messaging such as wireless emergency alerting (WEA) services for presidential, weather, and amber alerts, which are implemented by the wireless mobile carriers using the cell broadcast (CB) channels. Broadcast and multicast channels are point to multiple point "broadcasts" of messages from an originating source within or coupled to the networks via a defined interface but which are transmitted without receiver pre-identification, pre-registration, and without having knowledge as to the identity or number of receiving devices that will ultimately receive such transmitted broadcast message. Further, broadcast and multicast channel technologies have the inherent attributes of native and passive geo specificity and unbreakable anonymity as to the receiving device. In other words, neither the transmitting entity nor any of the communications networks involved with the broadcast from the "point" originating the message to the actual reception of the message by the receiving device can identify the devices that will receive the message nor the owner of such devices. Exemplary embodiments of such multicast bearer services for use as PSS Nets include but not limited to cell broadcast, LTE-M, NB-IOT, LoRAWAN, white space, or other mains delivered carrier technology.

PSS Net—Mobile Network Broadcast Technology Exemplary Embodiment

As one embodiment of a PSS Net in accordance with the present disclosure, the PSSS along with various components including the PSS data formatter can include an interface to a wireless mobile network that is configured to support point-to-multipoint multicast bearer service between the interface with the PSSS system and related components and an IoT device configured for data communication using a wireless mobile transceiver. Such support point-to-multipoint multicast bearer service are often known as multicast or in some mobile network standards as cell broadcast, but this network capability is defined in various network standards including, but not limited to, Cell Broadcast (CB) as supported by standards for GSM, UMTS, LTE and IS95CDMA, and 3GPP 023.041, by way of example, and not intended to be limited thereto. By way of specific example, CB is presently being used successfully all over the world as a point-to-multipoint non-addressed bearer service for the Wireless Emergency Alert system technology (WEA) and similar named services. CB has proven to be a reliable and very low cost technology which is finding yet further favor for public warning as well as other government to citizen communication roles. Many mobile networks have implemented CB to support WEA. Such non-addressed point-to-multipoint PSS Net bearer transport services enable the PSSS to transmit a PSS IoT message over an PSS Net channel 211 that includes a geodetic field that defines a PSS IoT geographic area that can be the geographic area to which a particular PSS IoT message is applicable as described below.

PSS-enabled IoT Device

Figure 3:
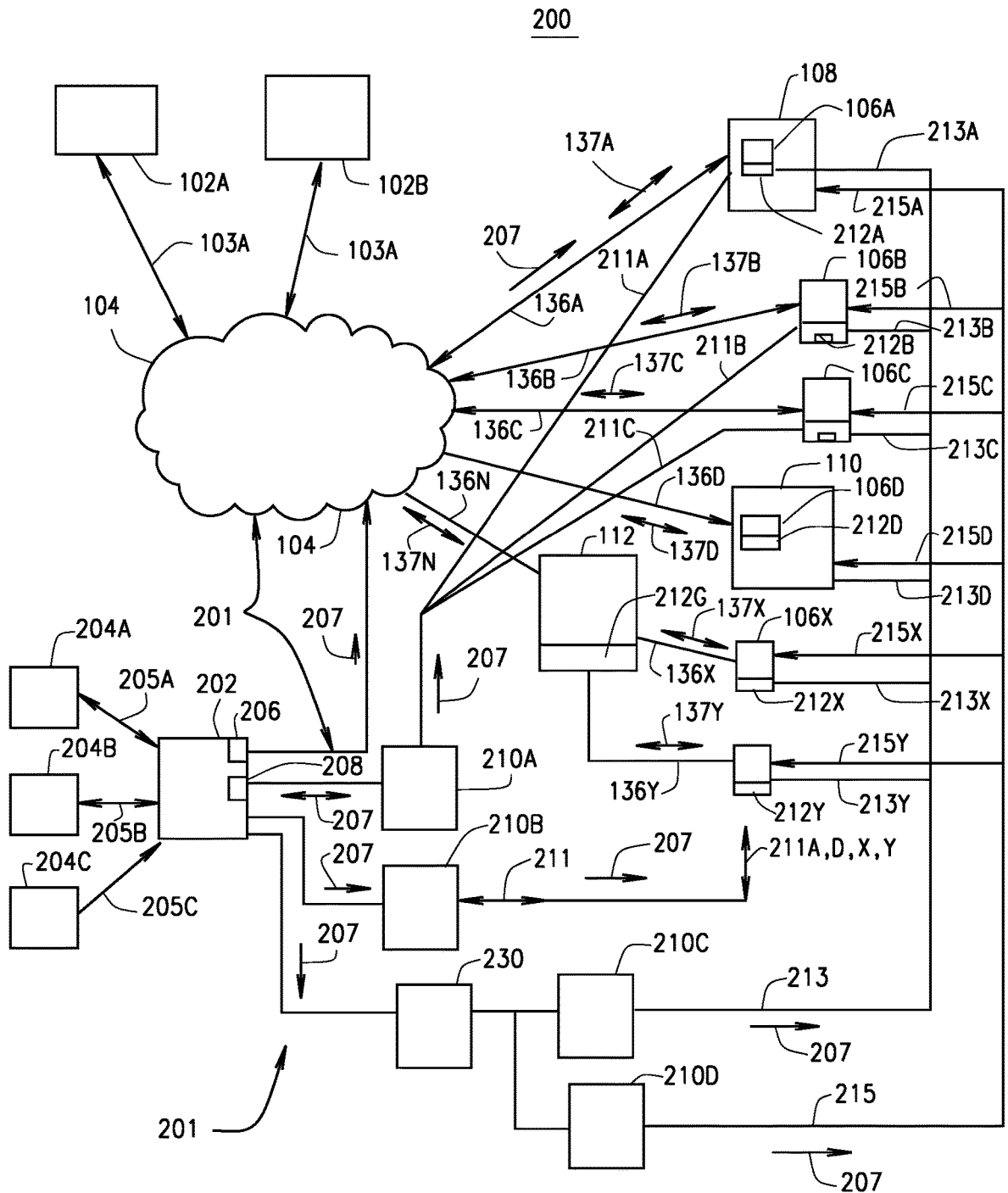
FIG. 3 is a block diagram of an enhanced IoT system architecture operating the IoT passive syndication service (PSS) and methods according one exemplary embodiment.

The present system and methods provides for changes and enhancements to the component structures of the IoT devices and IoT gateways that provide IoT devices with new interfaces and new data input and therefore functionality that is not presently in prior art IoT devices 106 as shown in FIG. 3 by way of example. This includes the providing of new novel IoT device PSS transceiver interfaces 212 that at a minimum includes a PSS channel receiver, but can also include a PSS channel transmitter. The functional operation of the PSS IoT interfaces (IPI) 212 is new in that such PSS IoT interfaces 212 not only connect via the Internet, but the IPI 212 also include the transmission frequencies and protocols for receiving PSS channel data over the new PSS IoT transmission networks 201 that are other than the traditional wired or wireless Internet.

Each IoT device 106 is configured to hunt all enabled and capable PSS Net 201 for which the IoT device 106 has an IPI 212 to find a valid PSS Channel 211 or data stream to which the IoT device 106 is configured to receive. As described herein, often the IoT device can be configured to attempt to find any available PSS Net and PSS Channel 211 carried thereon, without prior knowledge of what PSS Nets may be available to the IoT IPI 212 at that particular time or location. As referred to herein, the IPI 212 of the IoT device hunts all of the enabled PSS Nets to find one of the PSS Channels 211 for which the IoT device 106 is configured to receive. Once a valid applicable PSS Net 201 and PSS Channel 211 is identified by a particular IPI 212 of an IoT device 106, the IPI 212 verifies the PSS Channel 211, such as through review of a digital signature, metadata, encryption or header or the like.

Further, the operation of these IPI interfaces 212 are new in that the interfaces as described by the various disclosed embodiments herein can include the passive receiving of the PSS channels of the PSS Nets, whatever type, and can include the passive receiving of multiple PSS channel over multiple different technology based PSS Nets 201 at the same time. Further as described herein, rather than being configured for receiving point-to-point addressed messages 207 from the IoT Application Platforms, the IPI 212 interfaces are configured for monitoring and receiving PSS channels and data over non-addressed "broadcast" point-to-multipoint bearer PSS Net channels. As the PSS data is constantly streamed by the PSSS over various PSS pointto-multipoint non-addressed channels and over the various PSS Nets 201, the IoT devices via the various technology and functional IPI 212, receive and monitor all of the PSS IoT channel data (PSS Channel Data). However, each IPI 212 is configured to only monitor the PSS Channel Data to identify via "hunting" the IoT Channel Data from the various received channels of the PSS Nets that apply to that particular IoT device or IPI 212 of the IoT device. The IPI 212 and the IoT device are configured to only fully receive and process PSS Channel Data that is identified to be IoT applicable PSS data (PSS Device Applicable Data IDAD). Once identified, received IDAD PSS Channel Data messages 207 are fully received and processed such as by parsing, to extract the PSS message data that the IoT device is configured to utilize or need for its operations, such as one or more IoT Applications resident on the IoT device.

In some embodiments, one or more PSS-enabled IoT device can include one or more PSS IoT interfaces (IPI) 212 with each having one or more IPA Net channel receivers. While these can be transceivers, such is not necessarily required.

As addressed above, in some embodiments, each IPI 212 of a PSS-enable IoT device can include one or more receivers, each being capable of receiving different PSS Net channels, each of which may be on a different frequency or transport means and each of which utilizes a different PSS Net bearer transport technology. In some embodiments, one or more PSS channel communication interfaces can only include a PSS channel receiver that only receives the PSS channel that is broadcast by the PSS system. Of course the IoT device can include one or more different PSS channel interfaces, each of which can be configured for a different PSS channel transmission means or technology as described herein.

As such, in some embodiments, an IoT device can have more than one IPI, each of which is unique to the particular PSS Net bearer transport technology. For instance, one for wireless or wired communication via the Internet, another for television and radio White Space, another for multicast over a Wi-Fi network, and another for mobile telephone network cell broadcast bearer service.

The PSS-enable IoT device IPI can be configured in some embodiments to have wireless receiver interfaces for mobile telephone cellular CB signals, IOT signals or other signals. The IoT device is configured to monitor all of the available PSS Nets and therefore PSS Net channels in a process referred herein as PSS hunting. The PSS hunting process is a process or method by which the IPI of the IoT device passively discovers the availability of the PSS Net channels for that IoT device at any particular point in time. The IoT device is configured by a PSS personality file which defines the functions of the IoT device. Once an IoT device receives and identifies a PSS Net Channel that may be applicable to the particular IoT device, the IoT device can be configured to authenticate the PSS Net channel, and once authenticated, to decode it the PSS Net channel to obtain the PSS IoT message or messages 207 contained therein.

As described herein, the IoT device 106 can authenticate a particular PSS Net channel or PSS IoT message by reviewing for applicable predetermined PSS Net channels, such as those predetermined to be for a particular group or PSS user group, PSS IoT message type, message or channel header or flags, the port number, the encryption code, the included geographic field, any other suitable message flagging or identification as may be determined to be suitable for determining which PSS messages 207 or PSS Net channels are applicable to the IoT device or one or more IoT applications operating on or associated with the IoT device. This can also include a processing using hash algorithms or sampling algorithms including but not limited to use of check sums. The IoT device has these stored in its local memory and passively monitors all available PSS Nets and PSS Net Channels 211, and only fully receives and processes for authentication and message data receiving those that are matched to the IoT device PSS parameters as described herein and by programming of the IoT device.

To support the geographic targeted PSS IoT messaging as described above, an IoT device ID does not provide the ability to determine location as the IPA Net channels use point-to-multipoint non-addressed bearer services. When an IoT device is manufactured, the ultimate current location of the IoT device's installation and operation is not known until installed, and can change over time, and in some embodiments can be mobile, such as in a vehicle or associated with a person or another movable object. As such, in some embodiments, an IoT device needs to have its geographic location input or provided to the IoT device for storage in its memory for subsequent PSS Net channel monitoring and PSS IoT message processing. As addressed above, this can be by way of a local user interface, or as received from a local network, or as received from a GPS device that is associated with the IoT device.

In some embodiments, the identification of the current location of the IoT device can be self-determined by the IoT device without human interaction, such as by accessing the local network, identifying the local network address and any location data that is associated with that local network, or by monitoring and receiving a local PSS Net channel that includes a civic telemetry protocol message that provides the local current geographic location information to the IoT device. Of course the more local the transport or transmission range of the PSS Net to the IoT device, the more accurate such received current location data.

Passive Syndication Service Enabled IoT Systems
and Methods

Referring now more specifically to the first exemplary embodiment of FIG. 3, as shown the PSS IoT system 200 components and operation overlaid onto the prior art IoT system 100 as described above with regard to FIG. 1. Unlike the traditional IoT system 100 components, the PSS IoT system 200 (PSIS 200), PSS server 202 (PSSS 202) is separate and apart from the various vendor and application specific IoT application platforms 102 (102A and 102B as shown). While PSSS 202 may also be implemented in the Internet, a cloud or PaaS implementation, the functionality of PSSS 202 is not related to any particular IoT application platform 102 or the IoT applications 131 and the registrations of the IoT devices 106 associated therewith. PSSS 202 is communicatively coupled to one or more and usually a plurality of PSS IoT information or data sources 204 (PIDS 204) that are shown as PIDS 204A providing PSS IoT data 205A, PIDS 204B providing PSS IoT data 205B, and PIDS 204C providing PSS IoT data 205c to the PSSS 202. As shown, the PIDS 204 can provide such PSS IoT data 205 to the PSSS 202 on a push or receive only basis such as with a data service feed or subscription basis based on predetermined or predefined data types and flows, or can be provided in response to a request from the PSSS 202 for specific PS IoT data 205 in a PSSS 202 application.

The PSSS 202 can be communicatively coupled to IoT devices 106 via the internet 104 and IoT links 136 and IoT device interfaces 134 similar to that used by the PSS IoT application platforms 102. However, such common transport paths are communicatively separate and operationally different as the communication protocols used in the IoT messages 137 from the internet interface 206 of the PSSS 202 utilizes a non-addressed point-to-multipoint "broadcast" messaging protocol. While in some embodiments the PSS IoT messages 207 can be bi-directional as will be described herein, the primary operation of the PSS IoT messages 207 are pushed broadcast messages that are not addressed to any particular IoT device 106. In fact, the PSSS 202 system does not include any registry and does not require that the IoT devices 106 register with or identify themselves to the PSSS 202 in order to receive the PSS IoT broadcast messages 207.

Further, the IoT devices 106 also include, in addition to the IoT service interface 134, a new PSS IoT interface 212 (PSI 212) that is configured in the IoT device 106 for receiving the PSS IoT messages 207 from the PSSS 202. While the PSI 212 can be implemented in a common or combined electronics unit interface of the IoT devices 106 using PSS IoT interface 212, as the PSI 212 can operate using telecommunications receiver (and in some instances transmission) technologies and protocols in addition to the Internet or Wi-Fi or Bluetooth internet type communications, the PSI 212 will, at least initially, be implemented as a separate electronically implemented module or interface system, and in some implementations, may be one or more, as the transceiver functionalities may utilize off the shelf or similarly available devices that are designed specifically for communication over such PSS Network communications systems (PSS Net 201). For instance, by way of example and not limited thereto, such PSS Net interface 212 with one being related to TV white space, one being to mobile telephone networks using cell broadcast, one being to satellite communications, as well as others. Some of these may be combined as technological and manufacturing capabilities enable such, while others may be separate with each having a separate antenna. In some instances, the PSI 212 may be implemented in multiple components, with the PSI PSS IoT message and transmission system control functionality being managed by one component and the transceiver and communications with the various PSS Net 201 systems being handled one or more other components.

Figure 2:
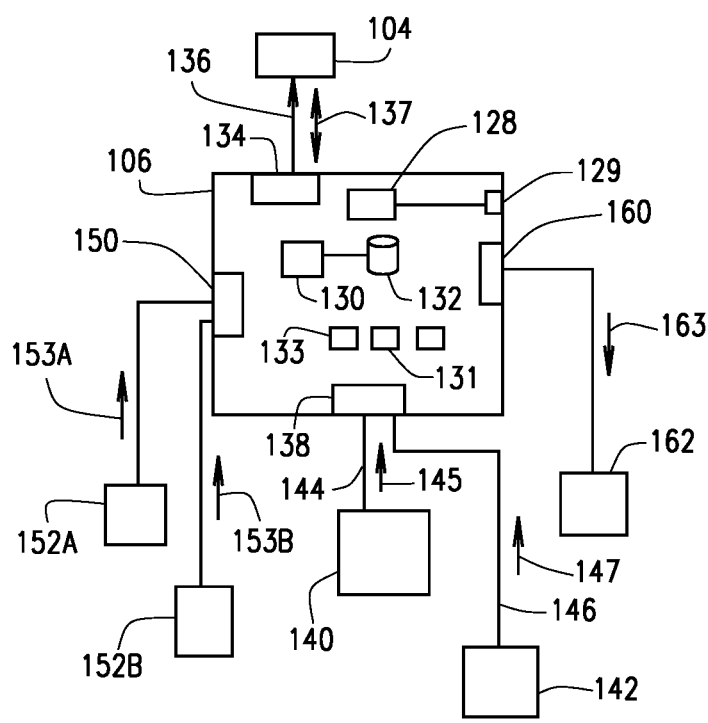
FIG. 2 is block diagram of a prior art internet of things object device (IoT device) according some exemplary implementations thereof.

As noted, in one embodiment the PSSS 202 can utilize a PSS IoT interface 212 for receiving PSS IoT broadcast messages 207 over here before non-traditional communications networks PSS Net 201 that utilize point-to-multipoint non-IoT device addressed broadcast channels 201 (broadcast channels 201 that broadcast the PSS IoT messages 207 to all listening devices without using addressing to any specific device). As shown in FIG. 3, this can include transmissions through a PSS Net 210A wireless or wired transport network (a particular type of PSS Net 201 and used herein where technically interchangeable) that supported multicast or cell broadcast or similar bearer transport channels 211. As shown, the PSS Net 210A can directly transmit the PSS IoT messages 207A over PSS Net channels 211A, 211B, and 211C to IoT device 106A, 106B, and 106C, respectively, wherein the PSI 212A, 212B, and 212C of each devices monitors such broadcast messaging and selects when and which transport channels 211 and which PSS IoT messages 207 are applicable and require capturing or reception and requiring further processing by the IoT device 106. Similarly, where a gateway 112 is implemented in the system 200, as with non-PSS IoT system 100, the gateway 112 can be equipped with a PSI 212G that receives the messages 207 and then forwards the messages 207 (shown as 207X) over link 136X to PSI 212X f IoT device 106X, and the messages 207 (shown as 207Y) over link 136Y to PSI 212Y of IoT device 106Y. As shown in FIG. 2, IoT device 106D is not equipped to receive the PSS IoT messages 207 from PSS Net 201 can be relied upon and monitored by the IoT device 106D for receiving the PSS IoT messages 207.

Figure 4:
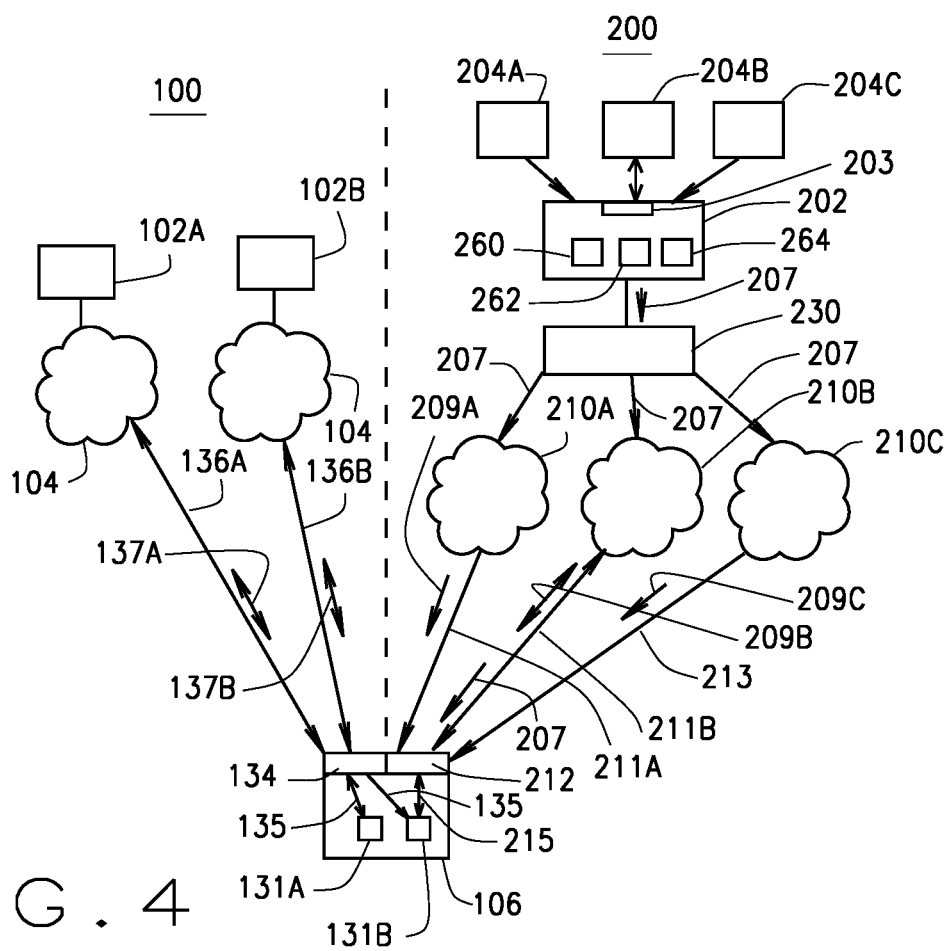
FIG. 4 is a second block diagram of an enhanced IoT system architecture operating the IoT passive syndication service (PSS) and methods according another exemplary embodiment.

As noted, multiple PSS IoT Nets 201 that provide point-to-multipoint non-addressed IoT device 106 can be implemented to provide transport of a plurality of PSS IoT messages 207 to each IoT device 106. FIG. 4 illustrates several additional possible embodiments of PSS IoT Nets 201. PSS Net 210B can provide PSS IoT messages 207 via link 211 to each of IoT devices 106 over bidirectional logical links 211A, 211B, 211, C, 211D, 211X and 211Y, as well as to gateway 112 as 211G. In this case, each IoT device PSI 212 would be equipped with not only a PSS IoT receiver, but also with at least some form of PSS IoT transmitter as will be discussed in some embodiments and modes of operation. An example of this may the broadcasting of PSS Net Channels 211 with the PSS IoT messages 207 over a mobile telephone network as the PSS Net 201 for which the PSI 212 is configured to monitor and receive as well to transmit messages such as requests to retransmit, to determine next transmission time, and the like. Such transmit capabilities are not limited, but in some embodiments, such transmit capabilities will be limited due to limited power and other resources of the IoT device 106.

PSS Net 210B can also provide PSS IoT messages 207 via network distributor device 230 that supports multiple PSS Net systems 210C and 210C for providing links 213 and 215, respectively. In such a case, network device 230 performs some functions of a gateway 112, such as, by way of example, geographic distribution of the PSS IoT messages 207 based on the geodetic field of the PSS IoT message 207. An example of this can include, by way of example, a mobile telephone network, a gateway or PSS IoT message distributor 230 function coupled to multiple television and/or radio transmitter providing geographically based transmission to defined or predetermined geographic areas. In such an exemplary embodiment, the PSS IoT message distributor 230 can be independent the network operator or performed internally to the network operators network operations, and still be within the scope of the present disclosure.

FIG. 4 provides an exemplary functional illustration of a PSS IoT system shown with the prior art IoT system 100 on the left side and the new PSS enhanced IoT system 200 components on the right. Further shown in FIG. 4 are several additional components of the PSS IoT system 200. The IoT system 100 is shown to have two IoT Application Platforms 102, 201B each of which communicates with the IoT device 106 via the internet 14 then to the IoT device 106 via links 136A, 136B communicating the IoT platform specific IoT messages 137A, 137B, respectively, to the IoT service interface 134, which is coupled to the IoT application programs 131A, 131B as a non-PSS IoT messages 135. Separate and apart from this traditional vendor specific IoT Application Platform 102 and the enabled IoT operation of the IoT device 106, the PSS IoT system 200 is providing PSS IoT messages 207 from the PSSS 202 to the PSI 212 interface of IoT device 106. As shown in this example, the PSSS 202 obtains, either as a push service from PIDS 204A, 204C or as a demand or request service from PIDS 204B, PSS IoT data. The PSSS 202 can include several different functional components or systems, which will be explains in more detail with regard to FIGS. 6, 7 and 8, by ways of example. This can include a PSS IoT data harvester 260, a PSS IoT message formatter 262, and a PSS IoT message distributor 230. The PSSS 202 or one of its subcomponents, such as either the PSS IoT formatter 262, or the PSS IoT message distributor 230 is communicatively coupled to an PSS Net 210 that transmits via point-to-multipoint messaging to the formatted and, where geographically processed by the distributer 230 or similar device, over PSS Nets 210A, 210B, and 210C to end links 211A, 211B, and 213, respectively, the PSS IoT Channels 209A, 209B, 209C, each that contain the PSS IoT messages 207. The PSI IoT Interface 212 of the IoT device 106 receives one or more PSS IoT channels 209A, 209B, and 209C that contain the PSS IoT messages 207. Once received the PSI IoT Interface 212 provides the PSS IoT message data 215 derived from the received PSS IoT message 207 to the IoT applications 131A and 131B as may be applicable and predetermined by PSS IoT enablement and programming thereof.

Figure 5:
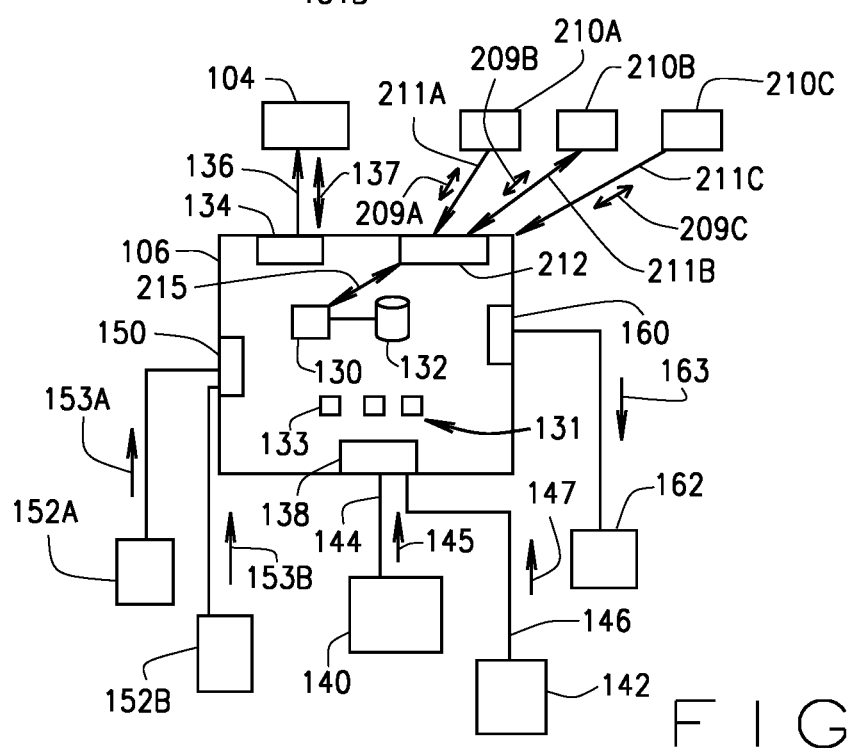
FIG. 5 is a block diagram of an enhanced IoT device having a passive syndication service (PSS) interface according another exemplary embodiment.

FIG. 5 is a functional diagram of a PSS-enabled IoT device 106 showing more detail than provided in FIG. 4, and as a comparison to FIG. 2 of the non-PSS IoT device 106 through having the PSI interface 212 and received PSS IoT messages 207. The components of the IoT device 106 of FIG. 4 are the same, but in the PSS-enabled IoT device, PSI interface 212 monitors and scans the various broadcast PSS IoT Channels 209A, 209B and 209C from PSS Nets 210A, 210B and 210C for receipt of the PSS IoT messages 207 over PSS links 211A, 211B and 213, respectively. The various operations enabled by the PSS-enabled IoT device 106 due to the receipt of the broadcast PSS IoT messages 207 are herein briefly described, but can be utilized by the IoT device 106 in any manner as an IoT application program 131 can be configured without any limitation.

Figure 6:
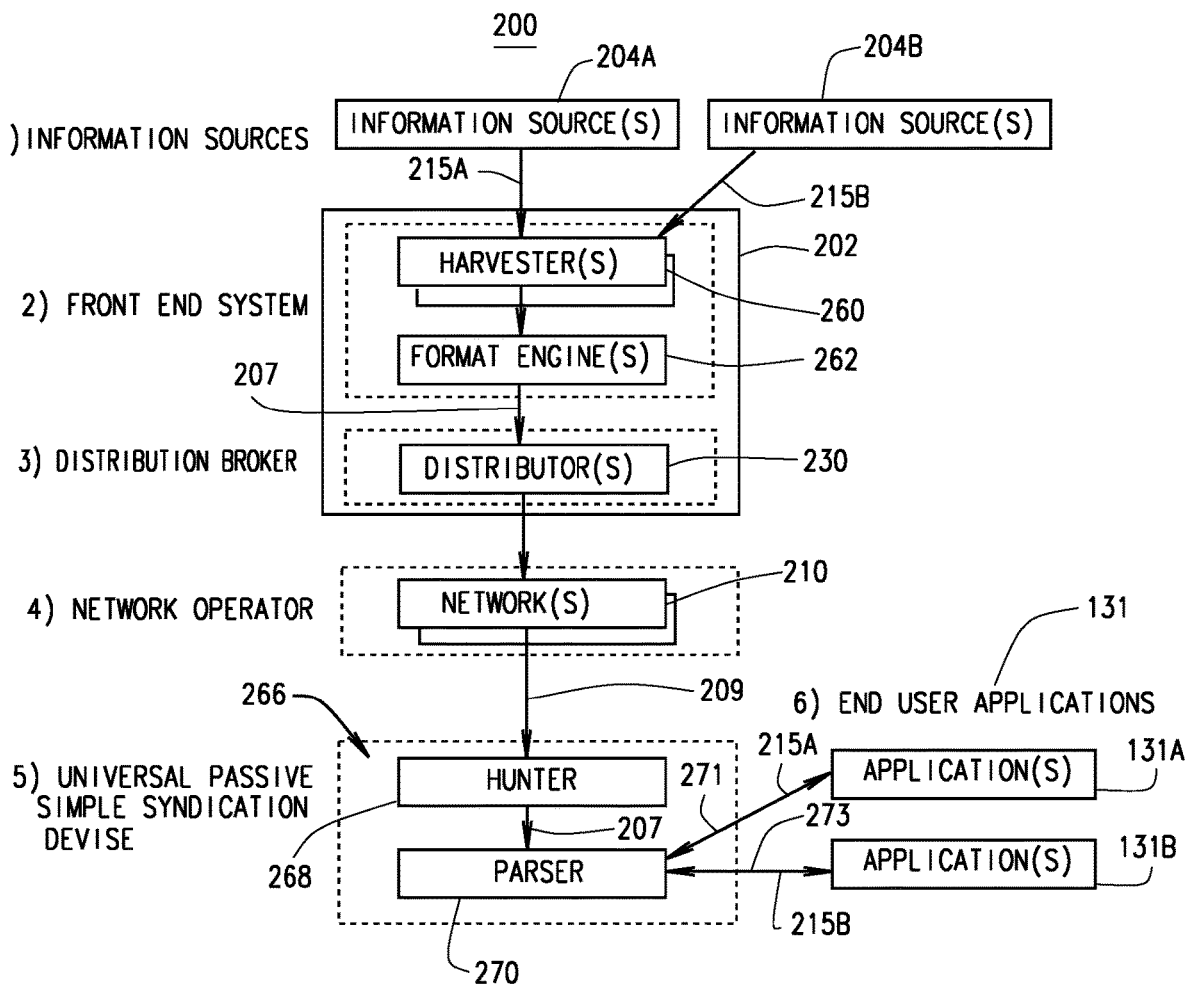
FIG. 6 is a block diagram of a passive syndication service (PSS) IoT system according one exemplary embodiment.

FIG. 6 is a functional block diagram of a PSS system 200 having two PIDS 204A, 204B with a plurality of PSS IoT data harvesters 260, each of which may be configured for harvesting PSS IoT data 205, 215 that is relevant to a particular PSS IoT channel 209, to a one or more PSS IoT groups of channels 209, or on a geodetic area basis as described herein. Once harvested, the PSS IoT data 205, 215 is provided to the PSS IoT formatter 262 for formatting for each PSS IoT channel 209 or creating the formats for the particular PSS IoT messages 207 that are included in a PSS IoT channel either directly or by a PSS IoT message distributor 230, that can be either a part of the PSSS 202 as shown, or a standalone component of the PSS system 200, or that can be implemented in whole or in part by the PSS Net 201 or Networks 210. As shown here, the IoT device 106 having the PSI 212 can include application or functional capabilities of "hunting" the various multiple PSS Nets 201 an monitoring them for relevant or applicable PSS IoT channels 209. A parser 270 can peak or review the high level PSS IoT channel data 205, 215 to determine this applicability. Once a PSS IoT channel 209 is identified that is applicable to the particular IoT device 106, the parser 270 can open and identified the PSS IoT messages 207 in detail for extracting the PSS IoT date 215 for providing to the IoT applications 131A, 131B.

Figure 7:
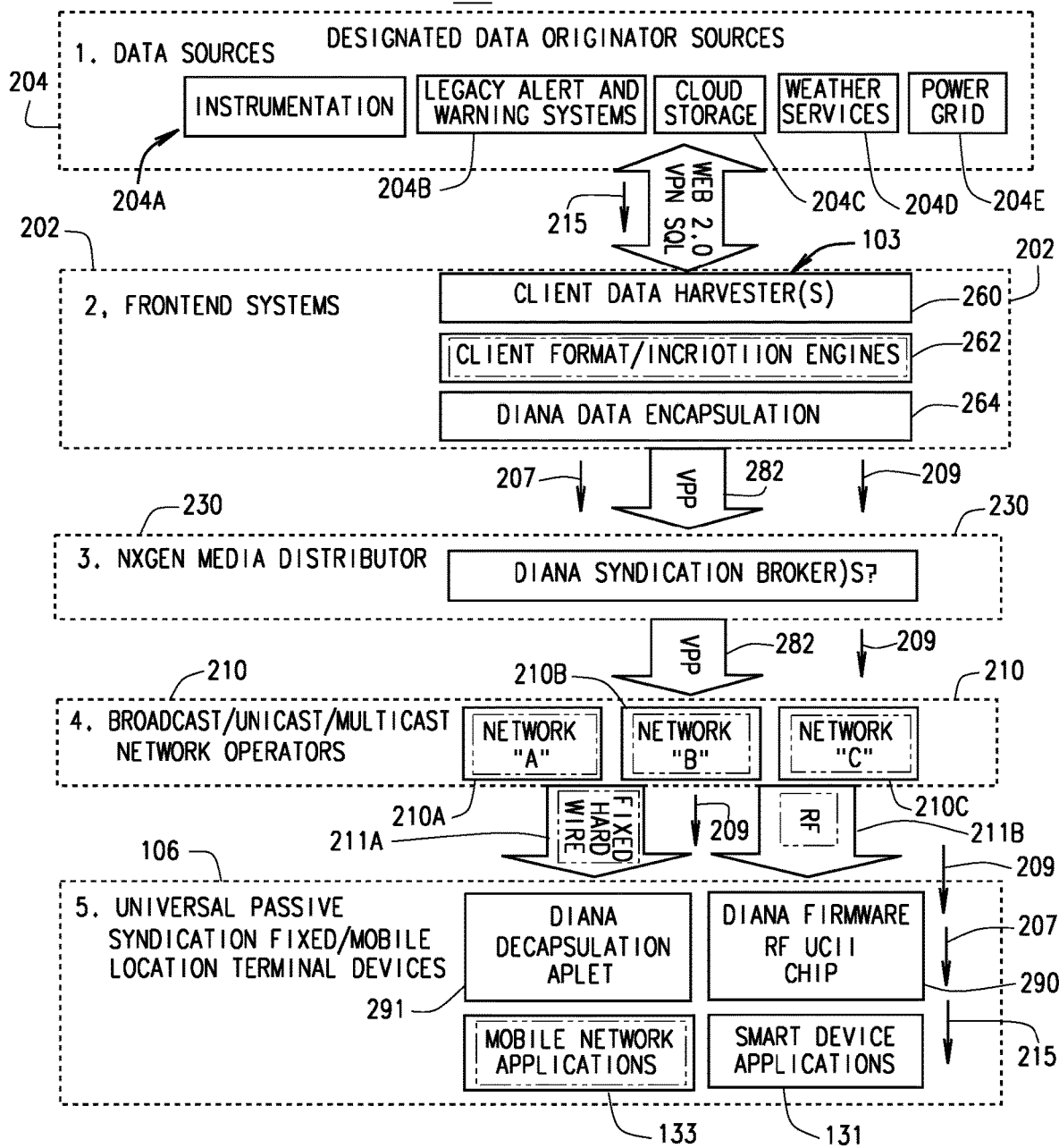
FIG. 7 is a block diagram of a passive syndication service (PSS) IoT system according to another exemplary embodiment.

FIG. 7 is a functional block diagram of PSS system 200 according to some exemplary embodiments. As shown the PIDS 204 can be specific to the types of data to which the PSSS 202 will obtain the PSS IoT data 215. This can include instrumentation PIDS 204A, emergency alerting PIDS 204B, cloud service PIDS 204C, weather service PIDS 204D and power grid PIDS 204E are four exemplary embodiments of the PIDS 204. The PSSS 202 obtains the PSS IoT data 215 via any suitable network interface, which is shown by way of example in FIG. 7 as a Web 2.0, VPN or SQL interfaces. The PSSS 202 collects the PSS IoT data 215 using a harvester 260. The PSSS 202 also can include an encryption engine that is within the formatter 262 for not only formatting the PSS IoT data 215 into the PSS IoT messages 207 but in some cases for encrypting such data. As shown in FIG. 7, the PSSS 202 can also include a data encapsulation component 264 for encapsulating the PSS IoT messages 207 for transport over the various different PSS Nets 201, 210 via a data link 282. In this exemplary embodiment, another PSS network component is illustrated as the PSS syndication broker or IoT message distributor 230 for providing the distribution of the prepared and formatted and possibly encrypted PSS IoT messages 207 for deciding which PSS Nets 201, 210 are to obtain the PSS IoT messages 207 via interface 282, again any suitable data network. The PSS Nets 210 are shown to be PSS Net 210A, 210B and 210C, each of which may utilize different broadcast transport technology which is shown as including, but not being limited to, radio frequency (RF) 211B, as well as fixed hard wire 211A network technologies. The PSS-enabled IoT device 106 is equipped with the PSI 212 interface that can include not only the receivers (and where applicable the transmitters in some embodiments), but also the protocols for monitoring the PSS IoT channels 209 as transmitted by the various PSS Nets 210A, 210B, and 210C. The IoT device 106 can include a RF UCII chip 284 as well as a de-capsulation applet 291 for monitoring and peeking into the received PSS IoT messages 207 to determine, based on programming in firmware or in software, that applicability of the PSS IoT message 207 to the particular IoT device 106 or any of its IoT applications 131. The IoT device 106 can also include one or more device applications 131.

Figure 8:
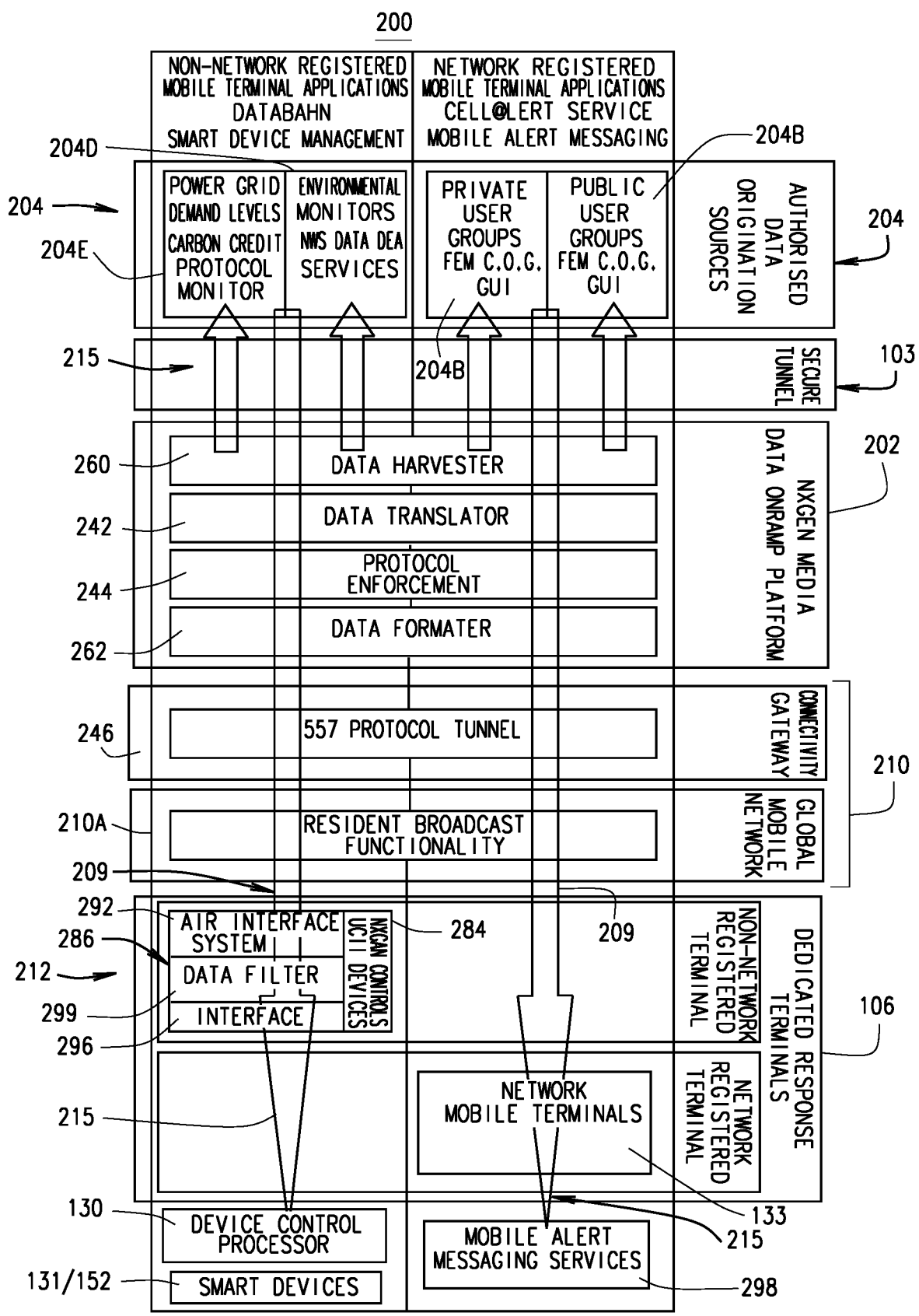
FIG. 8 is a block diagram of a passive syndication service (PSS) IoT system according to yet another one exemplary embodiment.

FIG. 8 provides another functional block diagram of PSS 200 from a slightly different embodiment. As shown, the PSSS 202 uses harvester 260 to access view secure tunnel 103 data communications, PSS IoT data 215 from PIDS 204 identified to include private user groups database 204B such as a front end GUI or CAPS interface from the FEMA closed user groups (COG) or the public user group database 204B. The Environmental PIDS 204D provides data related to NEW Data, DEA service and the Power Grid PIDS 204E provides power grid demand level and carbon credits data. The PSSS 202 further includes in this embodiment, a data translator 242 and a separate protocol enforcer or enforcement module 244, and the data formatter 262. After these processes, the PSS IoT messages 207 are provided, in this exemplary embodiment, using gate connectivity of the signally system seven (SS7) to a global mobile network 210A acting as the PSS Net 210 that provides the resident broadcast functionality for transmitting the cell broadcast channels as the PSS Net channels 211 for providing the point-to-multipoint non-device addressed PSS IoT messages 207 to the PSI 212 interfaces of the IoT devices 106. The IoT device 106, in this example, includes within the PSI 212 an air interface system 292, a data filter 286 and internal device interface 294 for providing the received and processed PSS IoT messages 207 to the IoT device 106 processor 130 and the IoT applications 131, 152. The PSI 212 can also include a controller 290 for controlling the operation of the PSI 212. In parallel function, similar capabilities can be implemented directly on the IoT device 106 equipped with a mobile network interface of a mobile device with the PSI 212 being configured from the cell broadcast channel functionality interfacing with the mobile carrier operating as the PSS Net 201, such as for an IoT Application 131 that operates as a mobile alerting messaging service 298, by way of example.

Figure 9:
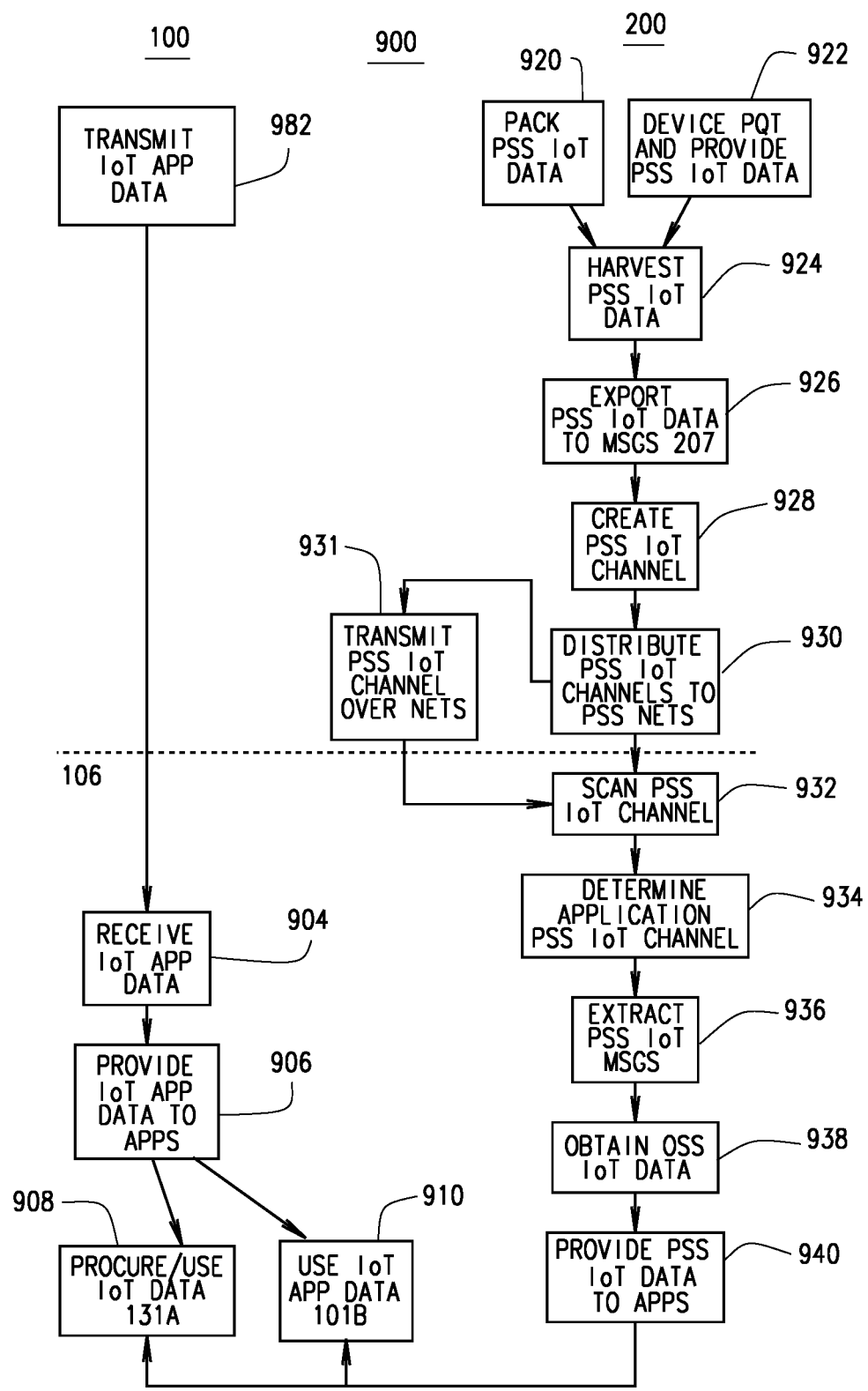
FIG. 9 is a flow chart of a passive syndication service (PSS) IoT system according one exemplary embodiment.

FIG. 9 is a flow chart of a method 900 of operating a passive syndication service (PSS) IoT system according one exemplary embodiment. As shown on the left side, the IoT Application Platform 102 transmits the vendor proprietary IoT data messages 137 over the Internet 104 to the IoT device 106 in step 902. The IoT device 106 in step 904 receives the IoT service data message 137 from the IoT Application Platform 102 and in step 906 provides the IoT data 137 to the IoT Applications 131A and 131B as applicable in steps 908 and 910. The PSS system 200 process provides in step 920 the pushed PSS IoT data 215 to the PSSS 202 and in step 922 the PIDS receives a request from the PSSS 202 and responds with the PSS IoT data. The PSSS 202 receives or harvests the PSS IoT data 215 in step 924 and provides the harvested data to the formatter 262 for formatting into PSS IoT messages 207 in step 926. Next in step 928 the formatted and PSS IoT messages 207 are compiled, encrypted or otherwise to form PSS IoT channels 209 that are provided to step 930 for distribution processing to the applicable PSS Nets 201. The PSS IoT channels 209 are transmitted to by the PSS Nets in step 931 over broadcast point-to-multipoint non-addressed channels that are received by the IoT device 106 in step 932. The IoT device 106 in step 932 scans the various PSS Nets 201 and the PSS IoT channels 209 and in step 934 determines the applicability of the PSS IoT channel 209 of each PSS Net 201 (typically two or more PSS Nets 201) to the particular IoT device 106 based on the programming of the IoT applications 131 operating thereon. Once a PSS IoT channel 209 is identified as being applicable, the IoT device 106 extracts or further processes the PSS IoT channel 209 to extract and determine or obtain the contents of the PSS IoT messages 207 contained therein in step 936. Once obtained, in step 938 the PSS IoT data 215 is extracted and is provided in step 940 to the applicable IoT applications 131A in step 908 or 131B in step 910. This is only exemplary and variations on this system process can include additional or fewer steps and still be within the scope of this disclosure.

Figure 10:
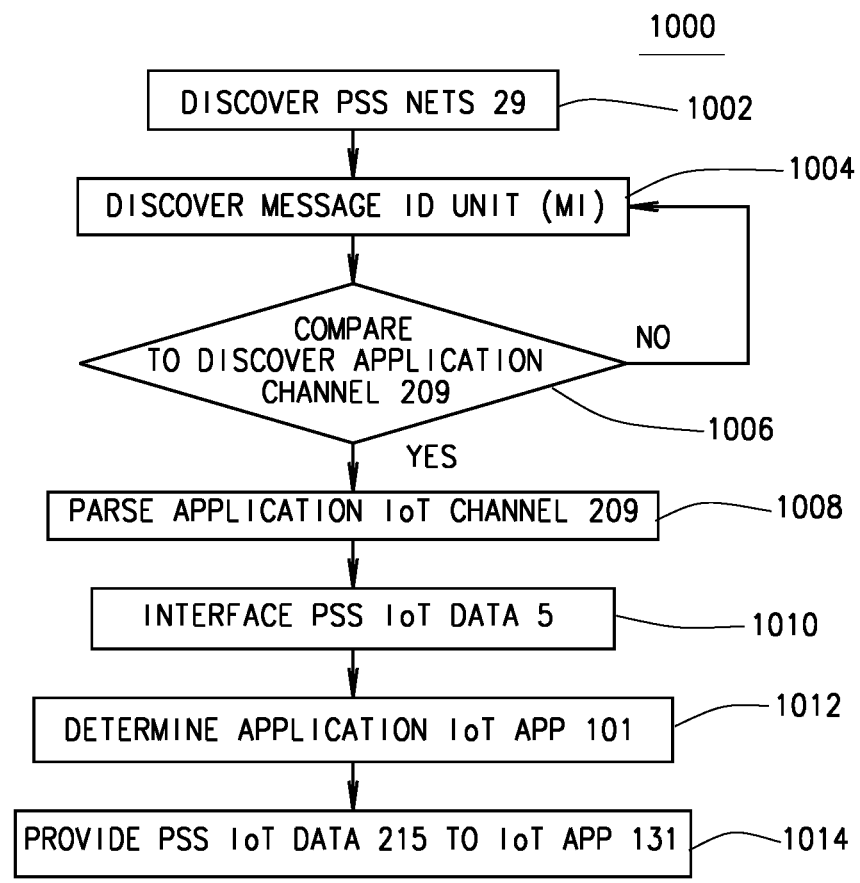
FIG. 10 is a flow chart of the operations of a PSS-enabled IoT device according to one exemplary embodiment.

FIG. 10 is a flow chart of the method 1000 for operations of a PSS-enabled IoT device 106 according to one exemplary embodiment. This is similar to described above as to FIG. 10. The IoT device 106 discovers the PSS Nets 201 that are currently available to the IoT device 106 in step 1002. In step 1004 the IoT device 106 discovers the message indicator (MI) or similar message header or flag or geodetic field to determine if the particular PSS IoT messages 207 or channels are applicable to the particular IoT device 106, by way of being applicable to the IoT applications 131 operating thereon in step 1006. Once an applicable PSS IoT message 207 or channel 209 is identified, in step 1008 the PSS IoT channel is parsed and the PSS IoT messages 207 and PSS IoT data 215 are identified and extracted in step 1010. Once extracted, the PSS IoT data 215 is identified to be applicable to one of the IoT applications 131 operating on the IoT device 106 in step 1012 and such is provided to the applicable IoT applications 131 on the IoT device 106 in step 1014 for use thereof. This is only exemplary and variations on this system process can include additional or fewer steps and still be within the scope of this disclosure.

PSS-enabled IoT Device Self-Configuration

In some embodiments, the PSS method permits the IPI 212 receiver of the PSS-enabled IoT device 106 to be purchased and then used in any location globally, without requiring any further configuration by installers at the receiver's location of installation. In addition, the device should be able to self-configure even if it is a mobile device and constantly changing its location.

Each participating network can transmit the passive syndication stream on a different Message Identifier (MI) code, specific to that network. If so, in one embodiment, the PSS-enabled IoT device 106 can perform the following features to accomplish its role and to fully utilize the received PSS data:

a. Discover which network is transmitting the passive syndication stream;
 b. Discover which MI is being used to identify the stream;
 c. Discover which 'Private' information steam relates to each transmission and intercept any required streams;
 d. Identify if the stream is a concatenated stream and re-assemble any fragments in correct order;
 e. Identify any subsequent repetitions of the stream and compare them for integrity with other discovered stream; and
 f. Identify the timestamp of any transmission in order to log and report reception of valid pages of data.

PSS-enabled IoT Device PSS Network Discovery

When activated, in some embodiments, the PSS-enabled IoT device 106 may not know where in the world it has been shipped and activated. In such embodiments, the IPI 212 of the IoT device 106 is configured to scan the mobile network bands or other frequency and PSS Nets to find the active PSS Net channel. This is accomplished by firmware in the receiver module. In some embodiments, when a list of currently available PSS Nets has been compiled by the IoT device, each PSS Net can be tuned in to and its PSS Net channel to check for the presence of a PSS Net channel (e.g., PSS syndication stream). This can be performed by any suitable network discovery algorithm or process.

Geotargeted PSS IoT Message Operations

As noted herein, PSS Nets utilize a non-addressed point-to-multipoint PSS Net bearer transport services that enables the PSSS 202 to transmit a PSS IoT message over an PSS Net channel to the IoT devices 106. The PSS IoT messages 207 can include a geodetic field that defines a PSS IoT geographic area that can be the geographic area to which a particular PSS IoT message is applicable as described below. The PSS IoT message field (geodetic field) that defines the PSS IoT geographic area can be any suitable technology, definition or scope, but in some embodiments is a PSS IoT geographically defined polygon. Such geodetic polygon can be defined by a series of WGS84 Latitude and Longitude coordinates in some embodiments. The PSSS 202 system or one of the PSS information sources can provide the PSS IoT geographic area that is associated with a particular PSS IoT message. Such PSS IoT geographic area can be included with a PSS IoT message that is formatted and transmitted to the PSS Net for transmission through the PSS Net to through the PSS Net channels.

In some embodiments, the PSS system can include an additional module or system component that collects or receives the PSS IoT messages 207 and determines the appropriate PSS channels or PSS Nets that are related to or that provide PSS point-to-multipoint non-addressed transport bearer service to each PSS IoT geographic area of each PSS IoT message field. In some embodiments, this geographic sorting and message allocation functionality can be included in the PSSS 202 front end systems or components such as the harvester 260 or formatter 262 as described here. In other embodiments, the PSS IoT messages 207 can be transmitted from the PSS system 200 such as the formatter 262 over an interface to a system or module such as a PSS IoT message distributor 230. In such embodiments, one function of the PSS IoT message distributor 230 is to receive all of the PSS IoT messages 207 or formatted PSS channel and then distribute each to an appropriate PSS Net 201 having an appropriate PSS bearer channel for transporting the PSS IoT channels 209 (data streams). This can include selecting an PSS Net based on the PSS Net providing PSS bearer channel message transport to the geographic area containing at least a portion if not all of the PSS IoT geographic area within the geodetic field of the PSS IoT message. In such embodiments, the PSS IoT message distributor 230 provides the PSS Net 201 only those messages 207 having geodetic fields that are within the transport area of the PSS Net 201, and therefore, the PSS Net may not be required to process the PSS IoT messages 207 or PSS IoT channels 209 once received, but only to transmit them over the predetermined PSS Net bearer transport service. In some embodiments, the PSS IoT message distributor 230 can also allocate PSS IoT channels 209 as received from the PSSS 202 or a PSS formatter 262 between PSS Net channels prior to providing the PSS channel data 205, 215 streams to the PSS Net. As such, the PSS Net merely provides the point-to-multipoint non-addressed bearer transport service between the PSS IoT message distributor 230 and the one or more IoT devices 106 that are monitoring that particular PSS Net 201.

Further, it is possible that in some embodiments, the PSS Net 201 can also review the geodetic area that is included in the PSS IoT message as received from the PSSS 202, PSS formatter 262, or PSS IoT message distributor 230 and also make determinations as to the transporting of the received PSS Net channel 211 or a PSS IoT message 207 contained therein, to provide for geographic routing and final transport to local network connections with the IoT devices 106. For instance, in such embodiments, if a mobile network having a CB transport feature as the PSS Net 201 is an PSS Net 201 that receives an PSS IoT message 207 containing the geodetic field, the mobile network can use a cell broadcast center (CBC) or similar system functionality to determine which sub-network or even which mobile cell site or cell provides at least a portion of the geodetic area of the PSS IoT message. By doing so, the mobile network acting as the PSS Net 201 can limit the final leg of the PSS transport bearer service within the PSS Net 201 to include only messages that do not have a geodetic field and therefore are not geographically targeted or messages that have a geodetic area that includes a particular subnetwork or mobile network cell or group of cell serving at least a portion of the geodetic area. By doing the latter, it is possible in current mobile network CB technology to limit the distribution of PSS IoT message having geodetic areas to local wireless transport network resources that cover specific areas that are about or sometimes less than 1 square kilometer. In such embodiments, a geotargeted PSS IoT message is natively and passively broadcast to specific geographic areas without the IoT device 106 having to determine its current location or to have the current location predetermined during installation, activation or registration. In this embodiment, the IoT device 106 would not be required to review or discriminate the geodetic area of the PSS IoT message, but would automatically presume that all locally broadcast messages that the IoT device 106 receives from one of the PSS Nets 201 over an PSS IoT channel 209 are geographically relevant to that particular IoT device 106.

In other embodiments, by way of example, a PSS IoT message having a particularly defined PSS IoT geographic area field populated can be transmitted over one or more PSS Nets 201 and over one or more PSS channels 209. By having the included the PSS IoT geographic area field in the PSS IoT message 207 that is received by each IoT device 106, the PSS IoT message 207 that is broadcast over the PSS Net 201 in the PSS channels 209, all IoT devices 106 that are monitoring the PSS channel 209 can receive and can review the geodetic field. Each IoT device 106 receives the PSS IoT message 207 and reviews the included PSS IoT geographic area field in the IoT device 106 programming to self-determine whether the particular PSS IoT message 207 is applicable to the particular IoT device 106 based on the matching of the PSS IoT geographic area to the current location of the particular IoT device 106. Such current location of the particular IoT device 106 can be preprogrammed into the IoT device 106 during installation or registration, can be provided by a user interface or by an IoT Application Platform, or can be self-determined through a local location detection receiver such as a global positioning system (GPS) receiver.

In this manner, in some embodiments the IoT device 106 can receive and passively identify "targeted" PSS IoT messages 207 and the PSS IoT data 205, 215 contained therein. An IoT device 106 that has a current location that is within the PSS IoT geographic area of the PSS IoT geographic area field of a particular PSS message is unknown to the PSS Net 201 as well as the PSSS 202. In some embodiments, each IoT device 106 can be configured to only receive PSS IoT messages 207 for which the IoT device 106 is geographically located within the PSS IoT geographic area field of an PSS Net channel 209 or PSS IoT message 207.

PSS IoT Message Identifier Discovery

The receiver now tunes in to the cell belonging to the network which has been identified as carrying to the syndication stream. It then attempts to resolve which Message Identifier (MI) has been selected by the carrier to carry syndication. It will have some knowledge of this from the Network Discovery algorithm mentioned earlier, but if not, then it uses the index channel to see if it has been identified by its alphanumeric tag. If not then it will open all channels and scan all information it sees, looking for the occurrence of the header protocols which contain the training sequence identifying the passive syndication channel. It further checks that the integrity checksum parameters are valid. If so it can determine the MI of the syndication channel, and enter this into its CBMI file in the SIM card so that this channel is intercepted.

Private PSS Message Identifier Discovery

The device may belong to a specific group, needing specialized telemetry data or company private data for this group of devices. The device contains a 'Personality Module', or file, which tells is which group it belongs to according to its function or group of functions. Accordingly, the message contains a 'Private Message Identifier' PMI field, which indicates the identity of the private group to which this device belongs. Furthermore, the PMI code can indicate the coding scheme used to compress or encrypt the data stream. As only the receiving device needs to know this, a level of security is provided for by obscuring each information stream by aggregating it with others. Thus unlawful interceptors are unable to derive a traffic pattern for the devices without knowing the PMI code. The PMI code can be related to the mobile network MI codes, and in particular any well-known MIs, but it can be further expanded to very large scales if needed.

PSS IoT Overview According to an Exemplary Embodiment

The Passive Simple Syndication system (PSS) enables devices to "syndicate" to PSS IoT Channels containing PSS IOT informational messages 207 in a passive way, thereby requiring little to minimal IoT device 106 resources. Upon receipt of such PSS IoT syndicated information messages 207 and the PSS IoT data 205, 215 contained therein, the IoT devices 106 are now enabled with updated information, parameters and data, which can be near real time, and possibly real time depending on the transport technology of the PS Net and technology and availability of resources within the PSS system. Further, it is also possible to provide such PSS Channel Data 205, 215 on a geographically targeted basis such that the received PSS Channel Data 205, 215 is geographically specific to the location of the IoT device 106. In some embodiments, the IoT devices 106 are updated with this updated near to real time and sometimes geographic specific and often IoT application specific data 205, 215 passively so that the IoT device 106 does not utilize a transmitter, does not need to have an active network account, does not need to be specifically identified by any of the PSSS 202 systems or applications 131, does not to be identified by any of the bearer service PSS Nets 201 or by peer IoT devices 106. While each PSS IoT device 106 typically operates on a receive only mode for monitoring PSS IoT channels 209 and for receiving and processing applicable PSS IoT channel 209 and the PSS IoT Channel data 205, 215 contained therein, in some embodiments, it is possible that the PSS IoT device 106 can also include a PSS IoT device 106 transmitter. In such embodiments, the IPI 212 can be a transceiver or another transceiver interface can be include an active PSS transmitter that further enables the PSS enabled IoT device 106 to query the PSS system for particular PSS information or data 205, 215 that is generally known to be PSS information in lieu of the IoT device 106 obtaining such from the IoT Application Platform to which it is registered.

In some embodiments, the "universal" PSS IoT device 106 is configured to hunt or monitor autonomously one or more PSS Nets 201 for which it may be configured, and then monitor or hunt for one or more PSS IoT channel 209 which is predetermined by the IoT device 106 to be of interest to the IoT device 106 or one or more of the IoT applications 131 operating on or under the responsibility of the IoT device 106. For instance, an IoT device 106 can monitor or hunt for the IoT bearer networks such as a mobile network, White Space, or a Wi-Fi network, by having an IoT receiver for such, and then to monitor such IoT channels 209 or valid IoT data streams, and to identify one that matches or is applicable. The IoT device 106 can use various means in this regard for example by simple header matching or by using a digital signature to verify the IoT channel or data stream.

As an IoT device "hunter", the IoT device 106 does not know in advance on which bearer network or PSS Net 201 it will find the desired or applicable IoT Channel. In such embodiments, the IoT device 106 is configured to derive all it needed information from the PSS IoT channel 209 and data 205, 215 contained therein itself. In such embodiments, the PSS IoT channel 209 can be formatted by the PSSS IoT format engine using predetermined sufficient and applicable metadata in order to enable authentication and identification of the PSS IoT channel 209 by the IoT device 106. The PSS Channel data 205, 215 or message contents of the PSS IoT channel 209 can be synthesized from various PSS IoT information sources, or by a PSSS harvester module 260 as described herein. In the embodiment with a PSSS harvester 260, the PSSS harvester 260 is programed with predetermined identifications of PSS IoT information that is predetermined for each PSS IoT channel 209 and also is configured to obtaining such from the PSS IOT information sources as may be required for populating each PSS IoT channel 209 with the proper informational data. The PSSS IoT format engine can be configured to convert any received and provided PSSS IoT raw data 205, 215 into PSSS IoT Channel data 205, 215 format and perform any required formatting, compression, hashing or encryption as required by the IoT device, or by a group of IoT devices 106, such as for a specific IoT device 106 or PSS IoT user group. The PSS system can include an IoT parser that reverses the prior format process and prepares the IoT data 205, 215 as necessary for the PSS IoT device 106 or IoT group format.

PSS IoT applications 131 within the IoT devices 106 can include PSS IoT algorithms for processing and consuming the received IoT data 205, 215 parameters from the applicable PSS IoT channels 209 and then utilize such received PSS IoT data 205, 215 as necessary and/or predetermined for enhanced operation of the IoT device 106 or one or more of the IoT applications 131 operating or under the control or supervision of the IoT device 106.

PSSS IoT Message Segmentation and IoT Device Concatenation Discovery

In some embodiments, the PSSS 202 system can provide for the fragmentation of the PSS IoT data streams into 'Pages' that may need to be re-assembled into order so that the checksums of the data protocols to be validated. If the enabling IoT technology does not do so, then the IoT data message within the IoT channels 209 or streams can include fields and protocols to enable the reassembly of any concatenated data elements or parts which are out of order once received by the IoT device 106. Accordingly, in some embodiments, the IoT data message can contain number sequence coding so that the IoT message can be reassembled by a concatenation algorithm implemented within the IoT device 106 that utilizes the number sequence coding consistent with that used by the PSSS 202 in segregating the PSS IoT information and data.

PSS IoT Device PSS IoT Message Repetition and Discovery

In some embodiments, the PSS Net bearer service 201 may not support or implement an automatic repeat request (ARQ) function as is often provided in other systems including the standard pre-PSS IoT implementations. For the IoT PSS Net 201, as such there is a possibility that the PSS IoT messages 207 will be missed or corrupted. To solve this problem, in some embodiments, the PSSS IoT method and system and functions and components thereof as described herein can provide for correction of such lost or corrupted transmissions of the PSS Net channel messages 207 by repeating the transmission of the same PSS IoT messages 207 on the IoT channel multiple times. To accomplish this, the receiving IoT devices 106 can be configured to continue to receive the multiple messages and determine if the message has already been fully received. Once a particular PSS IoT message is successfully received, the IoT device 106 can be configured to ignore the duplicated transmissions of the PSS IoT messages 207. For example, in order for the IoT device 106 to save energy, if a PSS IoT message has the same update number as one already correctly decoded, the IoT device 106 can ignore the next IoT message and go back to sleep until the next scheduled or predetermined transmission time.

PSS IoT Timestamp and Predetermined Timing of Applicable PSS IoT Message Support In some embodiments, a PSS-enabled IoT device 106 can be configured with a holistic algorithm to calculate any interpolated IoT data 205, 215 that it needs at the time from which the immediate PSS IoT message was sent by the PSSS 202 system. The IoT device 106 can be enabled through such received PSS IoT message data, and IoT application programming 131 within the PSS device 106 to determine or otherwise determine the time for any subsequent PSS IoT message 207 transmissions as they are planed or predetermined to occur for which that particular IoT device 106 may be interested or for which the PSS IoT message will be applicable. Accordingly, in some embodiments, the PSS IoT message 207 can include a timestamp identifying the valid time of dispatch or original transmission of the IoT message by a PSS IoT Application Platform (PSSS) 201. In other embodiments, the PSS IoT message can include a field or indicator as to when the next related PSS IoT message will be transmitted. In this manner, the IoT device 106 can go to sleep or discontinue spending resources and power in monitoring the PSS Net channels 207, and then wake back up, reactivate the IPI interface 212 of the IoT device 106 to once again begin to receive and monitor the PSS Net channels 211 to receive the next scheduled or predetermined timed transmission of the next related PSS IoT message that is applicable to that particular IoT device 106.

PSS IoT Exemplary Optional Operational Embodiments

A1. Enabled Smart Heuristic IoT Algorithm/Method

Smart buildings are controlled by a logic unit, which is able to strategize energy usage if it knows the environment and energy supply situation for many hours ahead. Accordingly, using the current system buildings logic unit can be installed with a receiver that receives a civic telemetry PSS IoT channel and the PSS IoT messages 207 being transmitted such as by data streaming over one or more PSS IoT (PSS) channels, one or more that provides the IoT device 106 with present and future environment and electric grid cost conditions. Such an IoT device 106 can be programs to utilize such received data 205, 215 to determine and implement a strategy aimed or directed to using current and planned used energy usage to reduce overall wasted energy, so as to optimize the energy use, not only for the present, but over a period of time. For example, the IoT device 106 can utilize a time heuristic algorithm or method to discover new PSS IoT data, and then utilize such in learning, solving and applying a practical method that provides a desirable result, that, while it may not be the perfect or optimal method, it is one that utilizes available data within minimum amount of local two-way communication and therefore minimum amount of processing and required powering of the IoT device 106 itself.

A2. Enabled Holistic IoT Capabilities

In some embodiments, a PSS-enabled IoT device 106 can be configured with a holistic algorithm to calculate any interpolated IoT data 205, 215 that is transmitted by the PSSS 202.

B. Reduce Non-Productive IoT Polling and Bandwidth Usage

Currently, many IoT devices 106 utilize a device initiated polling or application platform polling, both of which are very inefficient and often sporadic. For example, in some arrangements an IoT device 106 polls an IoT application platform or server at defined intervals, such as once a minute, or more or less. The IoT device 106 polls the IoT application server requesting updates to data or for providing new or updated information or parameters from the IoT application server in order for the IoT device 106 to perform its desired or required functionality or services. Like many polling applications, the vast majority of such IoT device 106 initiated polls result in no reply or a negative reply, such as a flag or message indicating there is nothing new to provide to the IoT device 106. Some of these IoT devices 106 use TCP/IP protocol to poll the IoT application client server via a local wireless network connection alone or in combination with the linking Internet connection. This polling uses up bandwidth as well as power. Furthermore, as the number of IoT devices 106 implemented rises, a very large amount of this polling traffic will begin to consume considerable bandwidth, most of which provides no updated information and therefore uses bandwidth without provided any value to the services or the IoT systems or services offered via the IoT devices 106.

In contrast, as described herein, PSS eliminates the need for IoT or any other form of polling for predefined generalized or application or geographic specific (or other categorized data IoT application updates) through providing a private passive slotted point to multipoint IoT data 205, 215 update paging system. By way of example, in one embodiment, PSS can have more than one mode. For instance, in one embodiment, mode 1 of PSS (PSS-1 mode), the IoT devices 106 have receivers or their local network links do not have, and are not required to have or use an uplink channel. In other words, each IoT device 106 only receives and does not have a transmitter and is not required to have a transceiver that transmits data 205, 215 and uses power for transmitting.

In Mode 1 PSS, the IoT device 106 only receives the IoT broadcast channel data 205, 215 as it intercepts that is being streamed or broadcast as described herein. The IoT devices 106 receives the IoT broadcast channel or channels, and reviews them for their applicability to the particular IoT device 106 or one or more of its applications 131, and only decodes those IoT broadcast messages 207 that the IoT device 106 is programed to need for its updates or updating its application data. One simple example, is that the IoT broadcast channels includes a first channel for local police data, a second channel containing stock market data, a third channel containing power grid load management data, and a fourth channel containing geographic specific weather data. An IoT device 106 that may be related to consumer energy consumption optimization, would receive all four channels, but would only decode the third and the fourth and only extract from the third and fourth channels only the information necessary for updating its applications and operations. All other received data 205, 215 would be ignored or discarded, and the IoT device 106 is constantly updated and only selects the data 205, 215 that it needs, and is not required to transmit a request to the IoT application server or to poll for receiving such updates.

In another mode, a mode 2 PSS device can have an uplink or transmitter capability (having a transceiver that receives and transmits), but with a limited battery supply for powering operations of the IoT device 106 and its transceiver. In such embodiments, the IoT device 106 (via its transceiver) remains off-line and cloaked from the IoT network and its one or more IoT application servers. The IoT devices 106 remain off-line unless and until the application program logic a programming of the IoT device 106 determines that the IoT device 106 needs to update its internally stored parameters or information. When such is determined, the IoT device 106 turns on the transceiver uncloaks its presence on the IoT network and through the IoT network makes secure contact with its primary or home IoT Application Server (PSS2). When such mode 2 PSS IoT devices 106 become uncloaked, the IoT device 106 may be paged by the IoT application server to receive a software upgrade or large file of new parameters or data 205, 215 or other information.

In other embodiments, in a third mode 3, (PSS-3 mode), the IoT paging streaming channels of IoT channel data, is transmitted over one or more PSS IoT broadcasting channels such that the IoT channel is encrypted. As such, the IoT device 106 could be required to first obtain a copy of the then current secure decryption keys relevant to the particular IoT device 106, to one or more IoT applications running on the IoT device 106 or to the particular IoT geographic location, or time or day or day or week, or the like. The IoT device 106 can perform this, by way of example, by using a transmitting uplink message notification from the IoT device 106 to one or more IoT application servers using a secure transmission format such as under secure VPN tunneling.

In some embodiments, when an IoT application server determines that a specific IoT application in a specific geographic area needs to leave the passive cloaked mode and come on line, it can do this by sending either a group paging message or a paging message specific to a specific device. This message will be embedded in the private paging message which is included in the civic telemetry stream.

Generally, the IoT device 106 includes IoT application logic that is configured to determine when an IoT paging message will or should be transmitted on one of the IoT application channels 209. As such, the IoT device 106 can remain asleep and cloaked most of the time, saving battery power and spectrum pollution, except when the IoT device 106 needs to be activated for receiving such broadcasted IoT application channel updated information. For example, if at a particular time and date it is predetermined that a particular IoT broadcast will be made on a particular IoT channel, the IoT device's transceiver can wake up and only then passively monitor the IoT channel or channels 209 for such a desired or necessary IoT message related to that particular IoT device 106 or one or more of its installed applications or operations. If the IoT device 106 does not receive or hear an IoT broadcast one PSS IoT channel 209 that is applicable to that IoT device, the IoT device 106 can then go back to sleep immediately, without having to engage or activate its power consuming transmitter or transceiver. However, if the IoT device 106 does receive an applicable broadcast IoT Channel message, the IoT device 106 can then uncloak itself, and can activate its transmitter to send an PSS IoT polling request to one or more predefined IoT application servers based on application type, group type or possibly geographic area, or other predetermined parameter type, in order for the IoT device 106 to obtain its desired and required updated IoT message data 205, 215 and information as may be needed or desired.

As such known to one of ordinary skill, after reading this disclosure will understand, by way of example, the described PSS processes and systems as described herein can dramatically reduce power consumption of the IoT device 106, reduce wireless bandwidth of the IoT device local 106 and spectrum usage, and optimize IoT device 106 network signaling resources.

C. Civic Telemetry Streaming

As noted, as IoT devices 106 in service and applications continue to grow, the sheer number of IoT devices 106 and IoT application servers will bring new challenges to current networks due to the introduction of a massive quantity of new IoT messages 207 that have been considered to be forecast to be in support of billions of IoT devices 106, each of which has a need to share information, to be updated with new parameters and data 205, 215 and to provide the desired services that includes communications of their application data. The inventors of the described systems and methods has identified this and proposed a new novel set of systems and methods to be implemented within IoT that has not yet been considered by industry standards or otherwise. The existing IoT systems utilize a conventional client-server relationship requiring TCP/IP, even though many may be "cloud-based" for storage, the communications requirements on local wireless and local internet network links will require a massive increase in network capacity scale loading. Having first identified this future need, the inventors hereof have developed the Passive Simple Syndication (PSS) systems and methods to be infinitely scalable by utilizing passive broadcast and multicast network capabilities and methods, that have not been considered since most IoT systems and methods assume a peer-to-peer or client-server relationship between all IoT devices 106. Against this common way of thinking and the architecture as currently considered by IoT standards and implementations, the proposed broadcast and multicast "broadcasting" (broadcasting as used herein is defined as transmitting communication messages from a single point, such as one of the many IoT application servers, over a network wherein such IoT communication messages 207 are not addressed to a particular recipient and as such the IoT Application Platform that is broadcasting such IoT communication messages 207 does not know, and has no reason or capability to know, of the identification or communication address of the potential IoT receiving devices, as such IoT broadcast messages 207 are transmitted natively and passively much like a radio station broadcasts its radio content. In some embodiments, like a radio broadcast station, the IoT communication messages 207 can include, but are not always required to in all embodiments, the identification of geographic or "geodetic" specific IoT parameters or IoT data.

For instance, a PSS IoT system (PSSS) 202 can transmit over an PSS IoT channel that is predetermined and registered within the PSS IoT system to be a weather channel, PSS IoT Channel W, by way of example. In such embodiments, the PSS IoT application server can include in the broadcasting of the PSS IoT messages 207 over the PSS IoT Channel W, PSS IoT messages 207 that include geodetic parameters providing weather data updates for various specific geographic areas that can be large or very small such as relatively small neighborhoods sized network areas or cells. The geographic areas in the IoT messages can be based on latitude and longitude that can be of any shape or size. An IoT device 106 that is programmed to monitor the PSS IoT Channel W for weather can monitor the PSS IoT Channel W and also peak or open the message to see if the PSS IoT message includes a geodetic message for the geographic area in which the IoT device 106 is then currently located, or that the IoT device application is otherwise programed to monitor. If the IoT device 106 identifies within the PSS IoT Channel W broadcast that the PSS IoT geodetic area is of pertinence to the particular IoT device, the IoT device 106 then can capture, open, and receive the contents thereof. If there is no match and the PSS IoT message 207 has a geodetic area that is not of interest to that particular IoT device 106 or its applications, the IoT device 106 can ignore the PSS IoT Channel W or that particular PSS IoT message 207. As such, in some embodiments, the geodetic message area can be in the PSS IoT channel header data along with other PSS IoT message header data as described herein.

In some embodiments such, as described above with PSS-1 (mode 1 PSS), the IoT devices 106 have IoT device receivers (IPI) 212 that have do not have a transmitter or other uplink channel or transmitter capability, but only have a receiver such as a radio frequency receiver. Such Mode 1 PSS IoT device 106 operations depend entirely on intercepting the PSS IoT messaging streams or PSS Net channels 211 for which it is programmed and decoding only the appropriate and applicable content. For example, one IoT device 106 may be decoding weather information or power grid status forecasts, but only for a particular geographic area in which the IoT device 106 is located or operational at the time.

In some other embodiments, such as mode 2 PSS, (PSS-2), a PSS IoT-2 device would have an uplink or transmitter capability as well. In such PSS-2 operation, the IoT device 106 would remain off-line and cloaked unless and until its own logic decides that further information is needed from the PSSS 202, in which case it uncloaks and makes secure contact with its home PSS2 server at that time. For example, it may be paged to receive a software upgrade or large file.

IN PSS-3 mode, the PSS Net channel 211 has been encrypted and the IoT device 106 needs to obtain a copy of the decryption keys relevant to the current location and timescale. The IoT device 106 may be configured to perform this via its uplink transmission to the PSS IoT application server (PSSS) using secure VPN tunneling or similar transmission telecommunications method and protocols.

In some embodiments, the PSS IoT system 200 as described herein can include a new PSS IoT function or functional element or application which is referred herein a "harvester" or "Harvester module" 260. In such embodiments, the PSS harvester 260 as described herein can provide for the new IoT functionality of searching for authentic applicable PSS IoT data 205, 215 for an IoT device 106. For instance, in one example, the PSS harvester 260 searches the PSS IoT channels 209 or IoT streamed data 205, 215 for IoT device 106 specific environmental information and forecasts data, and may, in some embodiments, also to search for information about the state of the power grid in the local area in which the IoT device 106 is operating. In some embodiments, this searched PSS IoT message data 205, 215 would be IoT information that is formatted and delivered through one or more PSS Nets 201 and that include general common data, as well as data the is particularly identified for a subset of IoT devices 106, such as by geographic area, application type, or TOT device type, by ways of example.

In some such embodiments, the IoT devices 106 have passive receiver-only capabilities that only search or hunt for area specific authenticated data and therefore would only receive the PSS channel 209 or streamed data based on a matching of a geodetic field in the PSS IoT channel data 205, 215 to that of the IoT device 106. Within the IoT device, there are one or more PSS IoT applications 131 that may utilize or desire such specific data 205, 215 and the IoT device 106 is configured to distribute the received PSS IoT data 205, 215 to the IoT applications within the IoT device 106. For instance, an IoT device 106 would pass environmental parameters and forecasts to the energy consuming applications within the IoT device, and each IoT application 131 would then have internal operational programming for use of such received IoT data. For example, an IoT enabled building device can use its stored knowledge of present and future weather and energy profiles along with the presently received updated and current IoT data 205, 215 to form a heuristic algorithm enabling the IoT device 106 for the building to help utilize energy consumed by various building operations to be used more efficiently.

In some embodiments, the PSS IoT system can include IoT application servers and IoT devices 106 that utilize one or more, such as two different PSS IoT broadcast or multicast transmission channel systems, such as the mobile network, satellite network, wireless network, wireless, TV or Radio White Space. In other embodiments the PSS IoT channels 209 can utilize two or more different channels 209 within the same PSS IoT application broadcast system through pre-assigning or predetermining PSS IoT Channels 209 for particular applications, or other uses, such as weather, emergency alerting, financial data, power usage, by ways of examples. For example, the PSS IoT channels 209 can be configured to have pre-assigned private IoT paging channels 211, in which private PSS IoT application servers and IoT devices 106 can be informed if there is need to poll the server or not. In other embodiments, the PSS IoT channels 209 can be logically formed such as by assignment of a channel ID or number on the same transmission channel. Regardless, this new PSS IoT broadcast message dissemination system and method will dramatically reduce the amount of required IoT polling traffic and as a result will speed up the responses from IoT devices 106 whenever PSS IoT parameter or data updates occur.

The PSS Net Channel Compared to a Mobile Network Paging Channel

It should be noted that the PSS IoT channel 209 point-to-multipoint passive receiver technology as described herein is different than what is currently implemented by mobile network paging channels 211. In such technology, mobile devices are assigned paging groups when they are first activated. By using these paging groups, the mobile device is allowed to sleep during paging groups to which it does not belong. The paging group indicator is the only field that is monitored, which is at the beginning of the paging message. Each mobile device reads just the paging group indicator to determine whether it should remain asleep or to waken. These mobile paging systems are a form broadcasting that most often use broadcast information to set up channels for one-to-one communications between the mobile transceiver and the base station. In a cellular mobile network, having limited cells where the mobile device can be located (as in GSM known as the location or if a data packet is involved a routing area or in LTE networks cells are in Tracking Areas). These paging broadcasts include the sending of broadcast paging messages to all of the cells within each of these areas such as for information transfer, SMS messages and for low downlink latency packet-based connections. This mobile network paging is a process is used to alert mobile devices when they are receiving a call, command or message. The mobile devices monitors and listen for paging messages as transmitted by the base station that include the identification code or telephone number of that particular mobile device on the paging channel. In other words, while the paging channel is a broadcast channel, the messages transmitted over the mobile network paging channels 211 are addressed to the particular mobile device to which the network is attempting to communicate and wake up the mobile device to receive a text message or telephone call. Each mobile device monitors this paging channel at all times to determine if its telephone number has been transmitted by the network. The mobile device only reacts or implements a routine such as waking up when the mobile device identifies its own telephone number or ID is included in the paging channel broadcast paging message.

The prior art mobile paging is completely different than described herein, as the present PSS IoT device 106 does not monitor the PSS Channel for its address or identification, but monitors multiple PSS Channels 209 to identify PSS Channels 209 to which it is programmed to receive, then only extracts the PSS IoT Channel data 205, 215 upon receipt of a PSS message within the PSS Channel that it is also programmed to receive and use by one of its IoT applications 131. In the present system, the PSS Channel does not include any addressing or identification of any of the IoT devices 106 and is unaware of what or which or how many IoT devices 106 may be within the reception area of the PSS Channel or that may actually receive the PSS Channel and use the PSS Channel data 205, 215 contained therein. The PSS Channel is purely a non-addressed pushed point-to-multipoint "broadcasting" over a broadcast or multicast PSS Net bearer channel 211. The IPI receiver interface 212 of the IoT device 106 equipped with PSS is configured to perform it basic functions as described herein as a receive only function wherein the IPI receiver interface 212 and the IoT device 106 are programmed to make the determination of which PSS Channel 207, 211 to listen to and monitor, and also which PSS Channel 207, 211 to open the PSS Channel message 209 to extract the PSS data 215.

Exemplary Implementation Environments

The systems, platforms, servers, applications, modules, programs, and methods described herein for the improved IoT systems and methods described herein including the primary and/or remote control panel systems and components thereof by way of example can include one or more a digital processing systems, as described herein simply as a "system" or component thereof. In one embodiment, illustrated in FIG. 11, various elements and system components of system 200 can be implemented as a computer system 700. Computer system 700 includes bus 708, processor 704 (including graphics subsystem), display interface 710, main memory 720, secondary memory 722, interface systems 732 and communications interface 726. Computer system 700 is also connected via communications path 726 via interface 712 to external networks 736. Various embodiments are described in terms of this example computer system. After reading this description, it will be apparent to a person skilled in the relevant art how to implement the invention using other computer systems and/or computer architectures.

Figure 11:
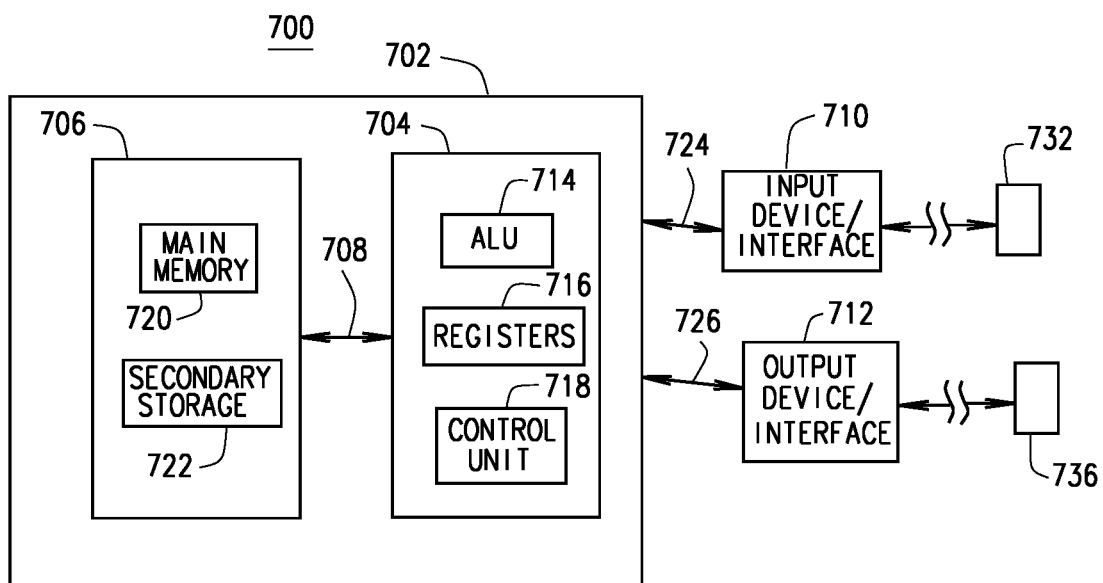
FIG. 11 is a block diagram of a computer system that may be used to implement a method and apparatus embodying the invention.

Processor 704, which can represent multiple processors, is connected to a communications bus 708. Graphics subsystem can be associated with processor 704 can be implemented as one or more processor chips. In fact, graphics subsystem can be included as part of processor 704 as shown in FIG. 11 or as a separate graphics engine or processor. Graphics data is output from the graphics subsystem to the bus 702.

Display interface 710 forwards graphics data from the bus 724 for display on the display unit 732. This graphics data includes graphics data for the screen displays described herein.

Main memory 720 can be a random access memory (RAM), and can also include a secondary memory 722. In the present invention the secondary memory 722 can include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc., which is read by and written to by removable storage drive. As will be appreciated, the removable storage unit includes a computer usable storage medium having stored therein computer software and/or data.

User interface module 710 transfers user inputs from peripheral devices 732. These peripheral devices 732 can be a mouse, keyboard, touch screen, microphone, joystick, stylus, light pen, or any other type of peripheral unit.

Computer system 700 can also include a communications interface 712. Communications interface 712 allows software and data to be transferred between computer system 700 and external devices via communications path 736. Examples of communications interface 712 that can be used with the present invention include a standard or cable modem, a DSL connection, a network interface (such as an Ethernet card), a communications port, a LAN connection, a WAN connection, etc. Computer programs and data transferred via communications interface 712 are in the form of signals which can be electronic, electromagnetic, optical or other signals capable of being received by communications interface 712, via communications path 736. Note that communications interface 712 provides a means by which computer system 700 can interface to a network such as the Internet.

The present invention can be implemented using computer programs (i.e., "software," or "computer control logic") running on Processor 704. The software can be originally stored as a "computer program product" in memory 706. Therefore, computer program product refers to means for providing software to computer system 700.

Computer programs can also be stored in main memory 720 and/or secondary memory 710. Computer programs can also be received via communications interface 726. Such computer programs, when executed, enable the computer system 700 to perform the features of the present invention as discussed herein. In particular, the computer programs, when executed, enable the processor 704 to perform the features of the present invention.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant arts.

In the example environment shown, communication interface 712 provides a two-way data communication coupling via a communications path to a local network 736. For example, if communication interface 712 is an integrated services digital network (ISDN) card or a modem, communication interface 712 provides a data communication connection to the corresponding type of telephone line, which comprises part of communications path 736. If communication interface 712 is a local area network (LAN) card, or connects to a LAN, then it can provide a data communication connection via communications path 736 to a compatible LAN. Wireless links are also possible. In any such implementation, communication interface 712 sends and receives electrical, electromagnetic or optical signals which carry digital data streams representing various types of information.

Communications path 736 typically provides data communication through one or more networks to other data devices. For example, in the present invention communications path 736 can provide a connection through local network to a host computer, cloud service or other data equipment operated by an Internet Service Provider (ISP), cloud service or platform as a service (PaaS). In turn, such provides data communication services through the worldwide packet data communication network now commonly called the "Internet", described in detail in other embodiments.

Computer system 700 can send messages and receive data, as well as computer programs, through the network or networks, communications path 736, and communication interface 712. If the network used is the Internet, server 702 can transmit a requested code for an application program through output interface 712 to output networks 736 such as the Internet, ISP, local network or any suitable communications path. Examples of such applications are the application programs run by application servers and database servers, as described in detail below.

Benefits—Technical Solution to a Technical Problem

The "Internet of Things" involves an exponential change in the scale of the number of devices communicating over a network. Using the traditional Client-Server model would involve creating billions of 'Stateful Relationship' between Network and end devices. This presents a burden on the network and greatly multiplies the effort needed to fulfil the end result, resulting in much larger costs and lower efficiency than is needed for the task in hand. The described system and method that the Applicant also refers to as "Passive IoT Data Syndication" is to use a multicast bearer service to stream the data, that is monitored by IoT devices 106 and received by IoT devices 106 as may be determined to be applicable to that IoT device 106 or its applications and services. The IoT device 106 intercepts the data stream and filters the information it needs for its functions and applications. Due to the described new and improved broadcast and multicast methodology for use in the IoT, there is no stateful relationship between the IoT data 205, 215 transmitting entity or devices and the IoT devices 106 (also often referred to as IoT Objects). The result is an unlimited scale of syndication up to infinite levels, with no incremental costs associated with exponential growth of IoT devices 106. Distributing the IoT data 205, 215 to billions of IoT devices 106 costs the same as reaching a single device, with trivial burdensome maintenance liabilities.

Further, the present system provides the new abilities to distribute non-vendor specific defined data 205, 215 to the IoT devices 106 for which IoT device applications can be developed that have not yet been developed due to the limitations on the present IoT for real time or near real time data from third party sources. Additionally, the present system can provide such real time vendor independent data on a geotargeted basis to only IoT that are located within a geographic area to which the real time or near real time data is pertinent or applicable. Further, the present system provides for new means of delivery of such IoT data 205, 215 to IoT devices 106 that is not limited or constrained by availability of a local wireless internet connection, as new forms of point-to-point non-addressed broadcast message transport networks and delivery to the IoT devices 106 are enabled that have not otherwise or heretofore been considered or included within the IoT network architectures, standards or implementations.

The present systems and methods required only incremental investment cost is the creation and management of the IoT data channels 209 and their predetermined content, and updates that may be required in the software and applications of the IoT devices 106 that may want to take advantage of any updated data or new data or new IoT data channels 209.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. An improved data device assembly having a processor and a memory comprising:
   a memory for storing one or more predetermined syndicated data device specific syndicated data channel identifiers;
   an syndicated data service interface that is communicatively coupled via a data network to one or more vendor-specific syndicated data application platforms and having one or more installed vendor specific syndicated data applications, the device having the syndicated data interface adapted for receiving one or more of the point-to-multipoint non-addressed transport bearer channels of one or more different syndicated data channel transport networks, the receiving initially only including the monitoring of the syndicated data channels and not processing of the syndicated data channels to decode the syndicated data messages or syndicated data informational data contained therein, the interfaced further adapted for identifying from the received and monitored transport bearer channels a received syndicated data channel having an syndicated data channel identifier of the specific syndicated data device as stored in the memory, and where identified, reading the syndicated data messages within the received syndicated data channel and extracting the syndicated data supplier-independent informational data from the syndicated data message and providing at least a portion of the extracted syndicated data informational data to at least one of the installed vendor specific syndicated data applications of the syndicated data device.

2. The system device assembly of claim 1 wherein at least one of the predetermined syndicated data channels is a cell broadcast point-to-multipoint non-addressed transport bearer channel of a mobile telephone network and wherein the syndicated channel syndicated data interface of the syndicated data device includes a mobile telephone cell broadcast interface.

3. The system device assembly of claim 1 wherein the syndicated data interface is adapted to receive at least one of the predetermined syndicated data channel that is a broadcast point-to-multipoint non-addressed transport bearer channel of a network selected from the group consisting of a mobile telephone network, a Wi-Fi network, a wireless network, a Bluetooth network, a television network, an AM or FM radio network, a white space network, a LAN, MAN or WAN network, a telephone network, an Internet, and a satellite network; and wherein the syndicated channel syndicated data interface of the syndicated data device includes a network technology interface compatible therewith.

4. The system device assembly of claim 1 wherein the received syndicated data channels includes a geodetic field defining a data-applicable geographic area applicable to the included syndicated data informational data and the syndicated data device is configured for storing a current syndicated data geographic location of the syndicated data device in the memory, and the receiving and monitoring the syndicated data channel transport networks includes identifying the data-applicable geographic location in the syndicated data channel or syndicated data message contained therein and comparing such with the stored current syndicated data geographic location, and wherein the reading of the syndicated data messages and the extracting of the syndicated data supplier-independent informational data is a function of the comparing process.

5. The system device assembly of claim 1 wherein the transmitted formatted syndicated data channel does not include the data-applicable geographic area but rather includes the channel identifier that is associated with a data-applicable geographic location of the syndicated data message, and wherein the syndicated data device stores at least one syndicated data channel identifier and the receiving and monitoring the syndicated data channel transport networks and the syndicated data channels includes identifying the syndicated data channel identifier of the received syndicated data channel or syndicated data message and comparing the received syndicated data channel identifier with the stored syndicated data channel identifier, and wherein the reading of the syndicated data messages and the extracting of the syndicated data supplier-independent informational data is a function of the comparing process.

6. The system device assembly of claim 1 wherein the syndicated data devices storing one or more predetermined syndicated data device specific syndicated data channel identifiers in the memory as at least a portion of the syndicated data message or channel selection criteria, and wherein the comparing, reading and extracting is a function of the received syndicated data channel identifier being at least one of the stored channel identifiers in the memory of the syndicated data device.

7. The system device assembly of claim 1 wherein the syndicated data device is configured to implement the one or more syndicated channel syndicated data interfaces within the syndicated data device as one or more components that are communicatively coupled to the syndicated data device processor and memory, and are separate and distinct operating modules from the syndicated data device service interface.

8. The system device assembly of claim 1 wherein the syndicated data device is configured to implement the one or more syndicated channel syndicated data interfaces within the syndicated data device an additional functional feature of the syndicated data device service interface.

9. The system device assembly of claim 1 wherein the one or more syndicated channel syndicated data interfaces are each receive-only interfaces configured only for monitoring and receiving one or more syndicated data channels from the point-to-multipoint non-addressed transport bearer channels of one or more different syndicated data channel transport networks.

10. The system device assembly of claim 1 wherein the one or more syndicated channel syndicated data interfaces are passive receive-only interfaces and that are configured to power off or sleep for a predetermined period of time or sleep criteria, and to awake and passively monitor the one or more syndicated data channels from the point-to-multipoint non-addressed transport bearer channels of one or more different syndicated data channel transport networks upon the occurrence of the predetermined period of time or sleep criteria.

11. The system device assembly of claim 1 wherein the one or more syndicated channel syndicated data interfaces are receive and transmit interfaces configured for monitoring and receiving one or more syndicated data channels from the point-to-multipoint non-addressed transport bearer channels of one or more different syndicated data channel transport networks, and to transmit a syndicated data device message over a separate outbound communications link responsive to the received syndicated data message or the extracted syndicated data informational data.

12. The system device assembly of claim 1 wherein the syndicated channel syndicated data interface is an interface associated with an Internet of Things (IoT) device and the syndicated data is a syndicated data configured for the IoT device.

13. The system device assembly of claim 1 wherein the syndicated channel syndicated data interface is an interface of a wireless devices and the syndicated data is a syndicated data associated with an emergency, safety or health condition or situation.

14. A method for providing a plurality of syndicated data devices with syndicated vendor-independent syndicated data for use thereby, each syndicated data device having an syndicated data service interface that is communicatively via a data network to one or more vendor-specific syndicated data application platforms and having one or more installed vendor specific syndicated data applications, the method comprising:
storing one or more syndicated data message or channel selection criteria;
receiving the one or more of the point-to-multipoint non-addressed transport bearer channels of one or more different syndicated data channel transport networks;
monitoring the received one or more of the point-to-multipoint non-addressed transport bearer channels of one or more different syndicated data channel transport networks;
identifying from the monitored transport bearer channels a received syndicated data channel as a function of a comparing to the store syndicated data message or channel selection criteria to the received syndicated data channel or syndicated data message contained therein;

in response to a successful comparing and the identifying of the received syndicated data channel, reading the syndicated data messages within the received syndicated data channel;

extracting the syndicated data supplier-independent informational data from the syndicated data message; and providing at least a portion of the extracted syndicated data informational data to at least one of the installed vendor specific syndicated data applications of the syndicated data device.

15. The method of claim 14 wherein at least one of the syndicated data channels is a cell broadcast point-to-multipoint non-addressed transport bearer channel of a mobile telephone network and wherein receiving by the syndicated channel syndicated data interface by the syndicated data device includes receiving the syndicated data channel and the syndicated data message over the cell broadcast interface.

16. The method of claim 14 wherein the receiving of the predetermined syndicated data channels is receiving over a network interface compatible with the group consisting of a mobile telephone network, a Wi-Fi network, a wireless network, a Bluetooth network, a television network, an AM or FM radio network, a white space network, a LAN, MAN or WAN network, a telephone network, an Internet, and a satellite network.

17. The method of claim 14, further comprising:

storing a current syndicated data geographic location of the syndicated data device in the memory;

the receiving and monitoring of the syndicated data channel transport networks including identifying the data-applicable geographic location in the syndicated data channel or syndicated data message contained therein; and comparing such with the stored current syndicated data geographic location, and wherein the reading of the syndicated data messages and the extracting of the syndicated data supplier-independent informational data are each a function of the comparing process.

18. The method of claim 14 further comprising:

storing at least one syndicated data channel identifier, wherein the receiving and monitoring of the syndicated data channel transport networks and the syndicated data channels includes identifying the syndicated data channel identifier of the received syndicated data channel or syndicated data message and comparing the received syndicated data channel identifier with the stored syndicated data channel identifier, and wherein the reading of the syndicated data messages and the extracting of the syndicated data supplier-independent informational data is a function of the comparing process.

19. The method of claim 14 wherein the syndicated data device performs the step including:

storing one or more predetermined syndicated data device specific syndicated data channel identifiers in the memory as at least a portion of the syndicated data message or channel selection criteria, and wherein the comparing, reading and extracting are each a function of the received syndicated data channel identifier being at least one of the stored channel identifiers in the memory of the syndicated data device.

20. The method of claim 14 wherein the syndicated data device performs the step including:

operating one or more syndicated channel syndicated data interfaces within the syndicated data device as one or more components that are communicatively coupled to the syndicated data device processor and memory and are separate and distinct operating modules from the syndicated data device service interface.

21. The method of claim 14 wherein the syndicated data device is an Internet of Things (IoT) device and the syndicated data is a syndicated data configured for the IoT device.

22. The method of claim 14 wherein the syndicated data enabled device is a wireless devices and the syndicated data is a syndicated data associated with an emergency, safety or health condition or situation.

* * * * *